United States Patent
Gan et al.

(10) Patent No.: US 11,743,171 B2
(45) Date of Patent: Aug. 29, 2023

(54) MULTI-LINK GROUP ADDRESSED TRAFFIC TRANSMISSION METHOD AND APPARATUS

(71) Applicant: HUAWEI TECHNOLOGIES CO., LTD., Guangdong (CN)

(72) Inventors: Ming Gan, Shenzhen (CN); Dandan Liang, Shenzhen (CN); Yiqing Li, Shenzhen (CN); Yuchen Guo, Shenzhen (CN); Yunbo Li, Shenzhen (CN); Jian Yu, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/988,579

(22) Filed: Nov. 16, 2022

(65) Prior Publication Data

US 2023/0071851 A1 Mar. 9, 2023

Related U.S. Application Data

(63) Continuation of application No. PCT/CN2021/098467, filed on Jun. 4, 2021.

(30) Foreign Application Priority Data

Jun. 4, 2020 (CN) .......................... 202010502329.3
Nov. 24, 2020 (CN) .......................... 202011334138.7

(51) Int. Cl.
*H04L 45/16* (2022.01)
*H04W 40/24* (2009.01)
*H04W 72/121* (2023.01)

(52) U.S. Cl.
CPC ............. *H04L 45/16* (2013.01); *H04W 40/24* (2013.01); *H04W 72/121* (2013.01)

(58) Field of Classification Search
None
See application file for complete search history.

(56) References Cited

U.S. PATENT DOCUMENTS

| | | | |
|---|---|---|---|
| 7,953,089 | B1 | 5/2011 | Ramakrishnan et al. |
| 10,609,647 | B2 | 3/2020 | Cariou et al. |

(Continued)

FOREIGN PATENT DOCUMENTS

| | | |
|---|---|---|
| CN | 101036321 A | 9/2007 |
| CN | 101145900 A | 3/2008 |

(Continued)

OTHER PUBLICATIONS

IEEE P802.11ax/D6.0, Nov. 2019, Draft Standard for Information technology- Tele-communications and Information exchange between systems Local and metropolitan area networks- Specific requirements, Part 11: Wireless LAN Medium Access Control (MAC) and Physical Layer (PHY) Specifications, 780 pages.

(Continued)

*Primary Examiner* — Brian S Roberts
(74) *Attorney, Agent, or Firm* — HUAWEI TECHNOLOGIES CO., LTD.

(57) ABSTRACT

This application is applicable to a multi-link group addressed traffic transmission method and an apparatus. A first access point (AP) of an AP multi-link device (MLD) sends group addressed traffic indication information indicating whether each AP of other APs of the AP MLD has a group addressed traffic, so that a station (STA) can learn whether the multiple APs have a group addressed traffic. In this way, each STA of the STA MLD does not need to listen to each AP whether each AP has a group addressed traffic. This reduces power consumption of the STA MLD. This application may be applied to a wireless local area network system that supports an IEEE 802.11ax next-generation (Continued)

Wi-Fi EHT protocol, for example, 802.11 series protocols such as 802.11be.

22 Claims, 16 Drawing Sheets

(56) References Cited

U.S. PATENT DOCUMENTS

| | | |
|---|---|---|
| 2009/0016306 A1 | 1/2009 | Wang et al. |
| 2016/0006822 A1 | 1/2016 | Kloberdans et al. |
| 2018/0092039 A1 | 3/2018 | Cariou et al. |
| 2018/0206284 A1 | 7/2018 | Zhou et al. |
| 2019/0037595 A1 | 1/2019 | Cherian et al. |
| 2019/0215884 A1 | 7/2019 | Patil et al. |
| 2019/0268956 A1 | 8/2019 | Xiao et al. |
| 2020/0037288 A1 | 1/2020 | Huang et al. |
| 2021/0029588 A1* | 1/2021 | Cariou .............. H04W 28/0263 |
| 2021/0051513 A1* | 2/2021 | Min ..................... H04W 72/21 |
| 2021/0144787 A1* | 5/2021 | Kwon .................... H04W 8/26 |
| 2021/0250963 A1* | 8/2021 | Seok ................ H04W 74/0816 |
| 2021/0298102 A1* | 9/2021 | Kwon .................. H04W 48/08 |

FOREIGN PATENT DOCUMENTS

| | | |
|---|---|---|
| CN | 102137334 A | 7/2011 |
| CN | 103209132 A | 7/2013 |
| CN | 103856397 A | 6/2014 |
| CN | 104254983 A | 12/2014 |
| CN | 108541047 A | 9/2018 |
| CN | 109428814 A | 3/2019 |
| CN | 109905849 A | 6/2019 |
| CN | 110972078 A | 4/2020 |
| EA | 008895 B1 | 8/2007 |
| IN | 201947023141 A | 7/2019 |
| WO | 2019139789 A1 | 7/2019 |

OTHER PUBLICATIONS

IEEE Std 802.Nov. 2016, IEEE Standard for Information technology-Telecommunications and information exchange 3etween systems Local and metropolitan area networks-Specific requirements, Part 11: Wireless LAN Medium Access control (Mac) and Physical Layer (Phy) Specifications, Approved Dec. 7, 2016, total 3534 pages.

IEEE 802.11-19/1988-03-00be, Ming Gan et al., Power Save for Multi-link, Nov. 2019, 15 pages.

IEEE 802.11-20/0084r1, Minyoung Park et al., Multi-link TIM follow up, Apr. 2020, 9 pages.

\* cited by examiner

AP MLD: access point multi-link device
STA MLD: station multi-link device
MAC: media access control
PHY: physical layer AP MLD: access point multi-link device
STA MLD: station multi-link device
AP: access point
STA: station

| MLD ID<br>Multi-link device identifier | Link ID<br>Link identifier | Change sequence<br>Change sequence number | Group addressed traffic indication |

MLD parameters subfield, MLD parameters subfield

| B0 | B1 | B2 | B3 | B4 | B5 | B6 | B7 |
|---|---|---|---|---|---|---|---|
| ESS<br>Expended service set | IBSS<br>Independent basic service set | Reserved<br>Reserved | Reserved<br>Reserved | Privacy<br>Privacy | Short preamble<br>Short preamble | Group addressed traffic flag | CSN updated flag change (sequence number updated flag) |

| B8 | B9 | B10 | B11 | B12 | B13 | B14 | B15 |
|---|---|---|---|---|---|---|---|
| Spectrum management<br>Spectrum management | QoS<br>Quality of service | Short slot time<br>Short slot | APSD<br>Automatic power saving transfer | Radio measurement<br>Radio measurement | EPD<br>Ethernet protocol identification | Reserved<br>Reserved | Reserved<br>Reserved |

Capability information field format (non-DMG STA)/capability information field

FIG. 5b

| B0 | B1 | B2 | B3 | B4 | B5 | B6 | B7 |
|---|---|---|---|---|---|---|---|
| ESS | IBSS | Reserved | Reserved | Privacy | Short preamble | RNR flag | Reserved |
| Expended service set | Independent basic service set | Reserved | Reserved | Privacy | Short preamble | RNR flag | Reserved |

| B8 | B9 | B10 | B11 | B12 | B13 | B14 | — |
|---|---|---|---|---|---|---|---|
| Spectrum management | QoS | Short slot time | APSD | Radio measurement | EPD | Reserved | Reserved |
| Spectrum management | Quality of Service | Short slot | Automatic power saving transfer | Radio measurement | Ethernet protocol identification | Reserved | Reserved |

Capability information field format (non-DMG STA)/capability information field

FIG. 5c

| Element ID | Length | Maximum BSSID indicator | Optional subelement |
|---|---|---|---|
| 1 byte | 1 byte | 6 octets | Variable |
Element ID: element identifier
BSSID: basic service set identifier
FIG. 10
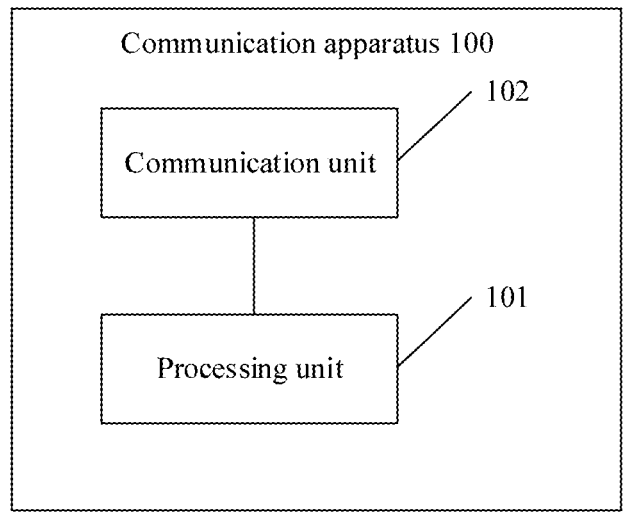
FIG. 11
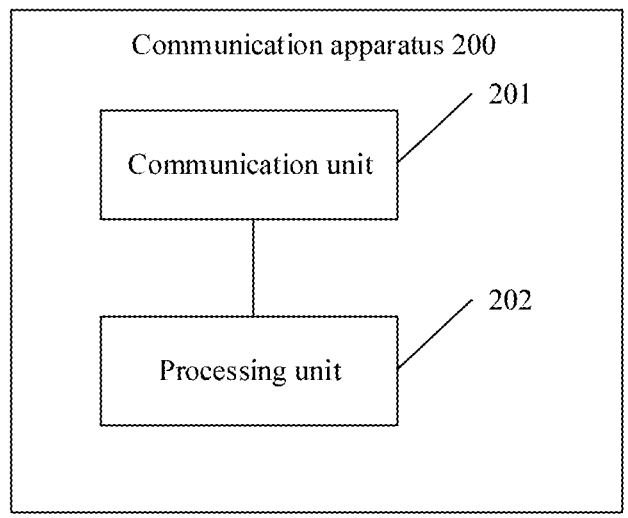
FIG. 12

MULTI-LINK GROUP ADDRESSED TRAFFIC TRANSMISSION METHOD AND APPARATUS

CROSS-REFERENCE TO RELATED APPLICATIONS

This application is a continuation of International Application No. PCT/CN2021/098467, filed on Jun. 4, 2021, which claims priority to Chinese Patent Application No. 202011334138.7, filed on Nov. 24, 2020 and Chinese Patent Application No. 202010502329.3, filed on Jun. 4, 2020. All of the aforementioned patent applications are hereby incorporated by reference in their entireties.

TECHNICAL FIELD

This application relates to the field of communication technologies, and in particular, to a multi-link group addressed traffic transmission method and an apparatus.

BACKGROUND

To significantly increase a service transmission rate of a wireless local area network (wireless local area network, WLAN) system, the institute of electrical and electronics engineers (IEEE, Institute of Electrical and Electronics Engineers) 802.11ax standard further adopts an orthogonal frequency division multiple access (OFDMA, Orthogonal Frequency Division Multiplexing) technology based on an existing orthogonal frequency division multiplexing (OFDM, Orthogonal Frequency Division Multiple Access) technology. The OFDMA technology supports multiple nodes to simultaneously send and receive data. This achieves multi-station diversity gains. In addition, the federal communications commission (FCC, Federal Communications Commission) released a new free frequency band of 5925 to 7125 MHz, where the frequency band is referred to as 6 GHz below. Therefore, an operating range of an 802.11ax-compliant device is expanded from 2.4 GHz and 5 GHz to 2.4 GHz, 5 GHz, 6 GHz, and the like.

IEEE 802.11 next-generation Wi-Fi protocol extremely high throughput (EHT, extremely high throughput) devices need to be forward compatible. Therefore, the devices also support operating spectra of the 802.11ax-compliant device, that is, 2.4 GHz, 5 GHz, and 6 GHz frequency bands. The IEEE 802.11ax next-generation Wi-Fi Protocol EHT device performs channel division based on the latest released free 6 GHz frequency band. A supported bandwidth, for example, 320 MHz, exceeds a maximum bandwidth of 160 MHz supported at 5 GHz.

A peak throughput for the IEEE 802.11ax next-generation Wi-Fi extremely high throughput device can be increased by using an ultra-large bandwidth, and can also be increased by increasing a quantity of streams, for example, increasing the quantity of streams to 16, through cooperation of a plurality of frequency bands (2.4 GHz, 5 GHz, and 6 GHz) and the like. On a same frequency band, a peak throughput may be further increased through cooperation of multiple channels or in another manner. This reduces a service transmission delay. In this specification, multiple frequency bands or multiple channels are collectively referred to as multiple links.

The IEEE 802.11ax next-generation Wi-Fi EHT device uses a multi-link cooperation technology to aggregate multiple inconsecutive links to form ultra-large bandwidth. In addition to aggregating higher bandwidth, the multi-link cooperation technology may further be used for simultaneously sending data packets of a same traffic to a same station. It can be learned that the multi-link cooperation technology greatly improves a transmission rate. However, for downlink group addressed traffic transmission, because each station in a station multi-link device needs to periodically stay in a working state to observe whether each access point in an access point multi-link device sends a downlink group addressed traffic, more energy is consumed.

SUMMARY

This application provides a multi-link group addressed traffic transmission method and an apparatus, to help reduce power consumption of a station multi-link device.

According to a first aspect, this application provides a multi-link group addressed traffic transmission method. In the method, a first access point (AP) of an access point multi-link device (AP MLD) generates group addressed traffic indication information, where the group addressed traffic indication information indicates whether one or more APs of the AP MLD have a group addressed traffic. The first AP sends the group addressed traffic indication information.

In an implementation, the group addressed traffic indication information indicates whether one AP of the AP MLD has a group addressed traffic, and the AP is the first AP or another AP of the AP MLD. Compared with a manner in which a station managed by the first AP can only learn whether the first AP has a group addressed traffic, this implementation improves flexibility of a group addressed traffic notification.

In another implementation, the group addressed traffic indication information indicates whether each AP in multiple APs of the AP MLD has a group addressed traffic. Compared with a manner in which a station (STA) managed by the first AP can only learn whether the first AP has a group addressed traffic, in this implementation, each STA of a STA MLD does not need to periodically listen to whether a corresponding AP has a group addressed traffic. In other words, in this implementation, one station of the STA MLD can learn whether multiple APs have a group addressed traffic. This reduces power consumption of the STA MLD.

In still another implementation, the group addressed traffic indication information indicates whether each AP of the AP MLD has a group addressed traffic. Compared with a manner in which a station managed by the first AP can only learn whether the first AP has a group addressed traffic, in this implementation, each STA of the STA MLD does not need to periodically listen to whether a corresponding AP has a group addressed traffic. In other words, in this implementation, one station of the STA MLD can learn whether each AP has a group addressed traffic. This reduces power consumption of the STA MLD.

In an implementation, each bit of the group addressed traffic indication information corresponds to each AP in the one or more APs of the AP MLD. Each bit indicates whether the AP corresponding to the bit has a group addressed traffic, or a value of the bit indicates whether the AP corresponding to the bit has a group addressed traffic.

In an implementation, each bit of the group addressed traffic indication information corresponds to each AP of the AP MLD. Each bit indicates whether the AP corresponding to the bit has a group addressed traffic, or a value of the bit indicates whether the AP corresponding to the bit has a group addressed traffic.

In an implementation, a correspondence between each bit of the group addressed traffic indication information and each AP of the AP MLD, or a correspondence between each bit of the group addressed traffic indication information and each AP in the one or more APs of the AP MLD may be configured by using an association response frame or a management frame between the STA MLD and the AP MLD.

In another implementation, a correspondence between each bit of the group addressed traffic indication information and each AP of the AP MLD, or a correspondence between each bit of the group addressed traffic indication information and each AP in the one or more APs of the AP MLD is predefined. In another implementation, the group addressed traffic indication information is a part of bits in a partial virtual bitmap field in a traffic indication map TIM element.

In an implementation, the group addressed traffic indication information is a part of consecutive bits in the partial virtual bitmap field. For example, if the group addressed traffic indication information is bit 1 to bit 7 in the partial virtual bitmap field, bit 1 to bit 7 in the partial virtual bitmap field may indicate whether each AP of the AP MLD has a group addressed traffic.

In another implementation, the group addressed traffic indication information is a part of inconsecutive bits in the partial virtual bitmap field. For example, if the group addressed traffic indication information is bit 1, bit 2, and bit 4 in the partial virtual bitmap field, bit 1, bit 2, and bit 4 in the partial virtual bitmap field may indicate whether each AP of the AP MLD has a group addressed traffic.

In an implementation, the first AP of the AP MLD generates association identifier (AID) configuration information, where the association identifier configuration information indicates an association identifier corresponding to each AP of the AP MLD. The first AP sends the association identifier configuration information. The AID of each AP corresponds to each bit of the group addressed traffic indication information. That is, each bit of the group addressed traffic indication information indicates whether the AP of the AID corresponding to the bit has a group addressed traffic. The association identifier configuration information may be sent to the STA MLD in an association response frame or a management frame.

In another implementation, an AID corresponding to a first bit or a start bit in the part of consecutive bits corresponding to the group addressed traffic indication information is predefined. In other words, the first bit or the start bit of the part of consecutive bits is predefined. Alternatively, a start bit location of the group addressed traffic indication information in the partial virtual bitmap field in the TIM element is predefined. Alternatively, AIDs of the APs of the AP MLD are consecutively allocated starting from AID x, where AID x is predefined. In this implementation, the group addressed traffic indication information is the part of consecutive bits in the partial virtual bitmap field in the traffic indication map TIM element.

An association identifier allocated to each AP of the AP MLD is different from an association identifier allocated to a station associated with the AP. In other words, the association identifier allocated to each AP of the AP MLD cannot be allocated by the AP to a station managed by the AP. However, AIDs allocated by different APs to stations managed by the APs are relatively independent. In other words, the AIDs allocated by different APs to the stations managed by the APs can be the same.

In addition, if one or more APs in the AP MLD are APs that work in a multi-BSSID mode and that are transmitted BSSID APs, in the foregoing two implementations, the AIDs of the APs of the AP MLD are consecutively allocated starting from AID x, where x is equal to max$\{2^{\wedge}(N_1)$, $2^{\wedge}(N_2), \ldots, 2^{\wedge}(N_y), \ldots, 2^{\wedge}(N_n)\}$. n is a quantity of transmitted BSSID APs in the AP MLD, and $N_y$ is a value of a maximum basic service set identifier BSSID indicator field in a multiple basic service set identifier (Multiple BSSID) element broadcast by a $y^{th}$ AP that is a transmitted BSSID AP of the AP MLD.

Alternatively, the AIDs of the APs of the AP MLD are consecutively allocated starting from AID x, where x is equal to max$\{2^{\wedge}(N_1), 2^{\wedge}(N_2), \ldots, 2^{\wedge}(N_y), \ldots, 2^{\wedge}(N_n)\}$. n is a quantity of APs in the AP MLD, and $N_y$ is a value of a maximum basic service set identifier BSSID indicator field in a multiple basic service set identifier (Multiple BSSID) element broadcast by a $y^{th}$ AP of the AP MLD. A value of a maximum BSSID indicator field of a default nontransmitted AP or an AP that does not work in a multi-BSSID mode is 0.

In other words, the start bit or the first bit of the part of consecutive bits that are in the partial virtual bitmap field and that correspond to the group addressed traffic indication information is bit x, where x is equal to max$\{2^{\wedge}(N_1), 2^{\wedge}(N_2), \ldots, 2^{\wedge}(N_y), \ldots, 2^{\wedge}(N_n)\}$. Alternatively, an AID corresponding to the start bit or the first bit of the part of consecutive bits that are in the partial virtual bitmap field and that correspond to the group addressed traffic indication information is AID x, where x is equal to max$\{2^{\wedge}(N_1), 2^{\wedge}(N_2), \ldots, 2^{\wedge}(N_y), \ldots, 2^{\wedge}(N_n)\}$. For physical meanings of n and $N_y$, refer to the foregoing description. Details are not described herein again.

In addition, the group addressed traffic indication information corresponds to the part of bits in the partial virtual bitmap field in the TIM element. Therefore, the first AP determines an offset field and a length field in the TIM element based on a start byte $N_1$ and an end byte $N_2$ in a traffic indication virtual bitmap field of the group addressed traffic indication information. The first AP may send the offset field and the length field. This helps a station that is associated with the first AP and that is in the STA MLD determine, based on the group addressed traffic indication information, the offset field and the length field, whether the AP corresponding to each bit of the group addressed traffic indication information has a group addressed traffic.

Optionally, in this embodiment of this application, the group addressed traffic indication information may be compressed by using an offset. In an implementation, it is assumed that the AP corresponding to each bit of the group addressed traffic indication information is sequentially allocated based on a size of an identifier of a link on which each AP of the AP MLD works, and none of multiple APs with consecutive link identifiers has a group addressed traffic. In this case, the group addressed traffic indication information may include only bits corresponding to APs other than the multiple APs, that is, the group addressed traffic indication information sent by the first AP may include the bits corresponding to the APs other than the multiple APs.

For ease of description, group addressed traffic indication information generated by the first AP is referred to as first group addressed traffic indication information, and group addressed traffic indication information sent by the first AP is referred to as second group addressed traffic indication information. The second group addressed traffic indication information may be the same as the first group addressed traffic indication information, or the second group addressed traffic indication information is a part of bits of the first group addressed traffic indication information. An offset of the second group addressed traffic indication information relative to the first group addressed traffic indication information is referred to as an offset of the second group addressed traffic indication information for short.

It is assumed that none of APs corresponding to bits prior to byte $N_1$ and all bits following byte $N_2$ of the first group addressed traffic indication information has a group addressed traffic, where $N_1$ is greater than or equal to 0, and $N_2$ is greater than or equal to 1. In this case, the second group addressed traffic indication information is all bits starting from byte $N_1$ of the first group addressed traffic indication information and ending at byte $N_2$.

In this case, a length of the second group addressed traffic indication information sent by the first AP is $N_2-N_1+1$, and the offset of the second group addressed traffic indication information is $N_1/2$. Further, the station managed by the first AP in the STA MLD receives the length and the offset, and may determine that the received second group addressed traffic indication information indicates whether APs corresponding to bits $N_1*8$ to bits $((N_2+1)*8-1)$ have a group addressed traffic, determine that APs corresponding to all bits from bit 0 to bit $N_1*8-1$ have no group addressed traffic, and determine that APs corresponding to bit $(N_2+1)*8$ and all subsequent bits have no group addressed traffic.

Bit a described in this application is an $a^{th}$ bit. For example, bit 0 is a $0^{th}$ bit.

It is assumed that none of APs corresponding to bit N0*8−1 to bit $N_1*8-1$ of the first group addressed traffic indication information has a group addressed traffic, and none of APs corresponding to bit $N_2*8$ and a subsequent bit has a group addressed traffic. In this case, the second group addressed traffic indication information is bits starting from byte 0 of the first group addressed traffic indication information and ending at byte N0−1, and bits starting from byte $N_1$ of the first group addressed traffic indication information and ending at byte $N_2$. In this case, a length of the second group addressed traffic indication information sent by the first AP is $N0+N_2-N_1+1$, and the offset of the second group addressed traffic indication information is N1−N0. Further, the station managed by the first AP in the STA MLD receives the length and the offset, and may determine that the received second group addressed traffic indication information indicates bits 0 to bits (N0−1)*8−1, determine whether APs corresponding to bit $(N_1-1)*8+1$ to bit $N_2*8+1$ have a group addressed traffic, and determine that none of APs corresponding to bit (N0−1)*8 to bit $(N_1-1)*8$ has a group addressed traffic.

In another implementation, when none of multiple APs with consecutive association identifiers has a group addressed traffic, the partial virtual bitmap field may not carry bits corresponding to these association identifiers. That is, a quantity of bits of the group addressed traffic indication information in partial virtual bitmap field is reduced by using an offset in the TIM element. It is assumed that the group addressed traffic indication information is the partial virtual bitmap field in the TIM element.

If none of APs of AIDs corresponding to a bit prior to byte $N_1$ and all bits following byte $N_2$ in the traffic indication virtual bitmap field has a group addressed traffic, where $N_1$ is greater than or equal to 0, and $N_2$ is greater than or equal to 1, the group addressed traffic indication information is all bits starting from byte $N_1$ of the traffic indication virtual bitmap field and ending at byte $N_2$. In this case, the length field of the TIM element sent by the first AP is $N_2-N_1+1+3$, and an offset of the TIM element is $(\frac{1}{2})N_1$. Further, the station managed by the first AP in the STA MLD determines, based on the received length and the offset, that the group addressed traffic indication information indicates whether APs of AIDs corresponding to bits $N_1*8$ to $((N_2+1)*8-1))$ have a group addressed traffic, determines that APs of AIDs corresponding to all bits of bit 0 to bit $N_1*8-1$ have no group addressed traffics, and determines that APs of AIDs corresponding to bits $(N_2+1)*8$ and all subsequent bits have no group addressed traffic.

If none of APs of AIDs corresponding to all bits of byte N0 to byte $N_1-1$ of the traffic indication virtual bitmap field has a group addressed traffic, the group addressed traffic indication information is bits starting from byte 0 of the traffic indication virtual bitmap field and ending at byte N0−1, and bits starting from byte $N_1$ of the traffic indication virtual bitmap field and ending at byte $N_2$. In this case, the length field of the TIM element sent by the first AP is $N0+N_2-N_1+1+3$, and an offset of the TIM element is $(N_1-N0) \frac{1}{2}$. Further, the station managed by the first AP in the STA MLD may determine, based on the length field and the offset of the received TIM element, that the received group addressed traffic indication information indicates bit 0 to bit (N0−1)*8−1, determine whether APs of AIDs corresponding to bit $(N_1-1)*8+1$ to bit $N_2*8+1$ have a group addressed traffic, and determine that APs of AIDs corresponding to bits (N0−1)*8 to bits $(N_1-1)*8$ do not have a group addressed traffic.

Optionally, the group addressed traffic indication information sent by the first AP is carried in a delivery traffic indication map (DTIM) beacon frame. Further, the first AP sends the group addressed traffic after sending the DTIM beacon frame.

Optionally, for a beacon frame, the group addressed traffic indication information may be carried only in the DTIM beacon frame. Optionally, the group addressed traffic indication information may be further carried in another frame such as a TIM beacon frame, a management frame, a data frame, or a control frame.

Optionally, if the group addressed traffic indication information is carried in the TIM beacon frame, the management frame, the data frame, or the control frame, and if the first AP has an AP providing a group addressed traffic, the first AP may further send the delivery traffic indication map DTIM beacon frame and a group addressed traffic after the DTIM beacon frame.

According to a second aspect, this application further provides a multi-link group addressed traffic transmission method. The method is described from a perspective of a station multi-link device STA MLD. In the method, a first station STA of the STA MLD receives group addressed traffic indication information from an AP MLD, where the group addressed traffic indication information indicates whether one or more APs of the AP MLD have a group addressed traffic.

Optionally, the first STA may determine or learn, based on the group addressed traffic indication information, whether the one or more APs have a group addressed traffic.

In an implementation, the group addressed traffic indication information indicates whether one AP of the AP MLD has a group addressed traffic, and the AP is the first AP or another AP of the AP MLD. In this implementation, the first STA can learn whether the first AP or another AP of the AP MLD has a group addressed traffic. This improves flexibility of a group addressed traffic notification.

In another implementation, the group addressed traffic indication information indicates whether each AP in multiple APs of the AP MLD has a group addressed traffic. In this implementation, the first STA may learn whether multiple APs have a group addressed traffic, so that each STA of the STA MLD does not need to periodically listen to whether a corresponding AP has a group addressed traffic. This reduces power consumption of the STA MLD.

In still another implementation, the group addressed traffic indication information indicates whether each AP of the AP MLD has a group addressed traffic. In this implementation, the first STA may learn whether each AP of the AP MLD has a group addressed traffic, so that each STA of the STA MLD does not need to periodically listen to whether a corresponding AP has a group addressed traffic. This reduces power consumption of the STA MLD.

In an implementation, the first STA of the STA MLD is a station working on a primary link, and that a first STA of the STA MLD receives group addressed traffic indication information from an AP MLD includes: The first STA of the STA MLD listens to, on the primary link, the group addressed traffic indication information from one AP of the AP MLD.

Optionally, for a beacon frame, the group addressed traffic indication information may be carried only in a DTIM beacon frame.

Optionally, the group addressed traffic indication information may be carried in another frame such as a TIM beacon frame, a management frame, a data frame, or a control frame.

Optionally, the group addressed traffic indication information is carried in another frame such as a TIM beacon frame, a management frame, a data frame, or a control frame. The first STA may receive the DTIM beacon frame, and receive the group addressed traffic after receiving the DTIM beacon frame. Correspondingly, if another STA of the STA MLD learns, based on the group addressed traffic indication information, that a corresponding AP also has a group addressed traffic, the another STA may receive the DTIM beacon frame and receive the group addressed traffic after receiving the DTIM beacon frame.

Optionally, the group addressed traffic is carried in a DTIM beacon frame, and the first STA may receive a group addressed traffic after receiving the DTIM beacon frame. Correspondingly, if another STA of the STA MLD learns, based on the group addressed traffic indication information, that a corresponding AP also has a group addressed traffic, the another STA may receive the DTIM beacon frame and receive the group addressed traffic after receiving the DTIM beacon frame.

In another implementation, if determining that an AP on the link on which the first STA works has a group addressed traffic, the first STA may receive, on the link, a delivery traffic indication map DTIM beacon frame from the AP and a group addressed traffic after receiving the DTIM beacon frame.

In an implementation, each bit of the group addressed traffic indication information corresponds to each AP of the AP MLD. A value of the bit indicates whether the AP corresponding to the bit has a group addressed traffic. For related description of this implementation, refer to related content in the first aspect. Details are not described herein again.

In another implementation, the group addressed traffic indication information is a part of bits in a partial virtual bitmap field in a traffic indication map TIM element. For related description of this implementation, refer to related content in the first aspect. Details are not described herein again.

In still another implementation, the group addressed traffic indication information is a part of consecutive bits in a partial virtual bitmap field in a traffic indication map TIM element. For related description of this implementation, refer to related content in the first aspect. Details are not described herein again.

Because AIDs corresponding to some bits in the partial virtual bitmap field are allocated to a station, and these bits separately indicate whether a corresponding station has a unicast traffic. Therefore, in this implementation, an association identifier allocated to each AP of the AP MLD is different from an association identifier allocated to a station associated with each AP. In other words, the association identifier allocated to each AP of the AP MLD cannot be allocated by the AP to a station managed by the AP. However, AIDs allocated by different APs to stations managed by the APs are relatively independent. In other words, the AIDs allocated by different APs to the stations managed by the APs can be the same.

In an implementation, the first STA of the STA MLD receives association identifier configuration information, where the association identifier configuration information indicates an association identifier AID corresponding to each AP of the AP MLD. The AID of the AP corresponds to each bit of the group addressed traffic indication information. The first STA determines, based on the association identifier configuration information, the AID corresponding to the AP of the AP MLD. For related description of this implementation, refer to related content in the first aspect. Details are not described herein again.

In another implementation, an AID corresponding to a first bit of the part of consecutive bits that are in the partial virtual bitmap field and that correspond to the group addressed traffic indication information is predefined. For related description of this implementation, refer to related content in the first aspect. Details are not described herein again.

In still another implementation, an AID corresponding to a first bit of the part of consecutive bits is AID x, and x is equal to $\max\{2^{\wedge}(N_1), 2^{\wedge}(N_2), \ldots, 2^{\wedge}(N_y), \ldots, 2^{\wedge}(N_n)\}$. n is a quantity of transmitted basic service set identifier APs in the AP MLD, $N_y$ is a value of a maximum basic service set identifier BSSID indicator field in a multiple basic service set identifier multiple BSSID element broadcast by a transmitted BSSID $AP_y$. The transmitted BSSID $AP_y$ is a $y^{th}$ transmitted BSSID AP in the AP MLD. For related description of this implementation, refer to related content in the first aspect. Details are not described herein again.

Optionally, in this embodiment of this application, the group addressed traffic indication information may be compressed by using an offset. In an implementation, it is assumed that the AP corresponding to each bit of the group addressed traffic indication information is sequentially allocated based on a size of an identifier of a link on which each AP of the AP MLD works, and none of multiple APs with consecutive link identifiers has a group addressed traffic. In this case, the group addressed traffic indication information may include only bits corresponding to APs other than the multiple APs, that is, the group addressed traffic indication information sent by the first AP may include the bits corresponding to the APs other than the multiple APs. For related description of this implementation, refer to related content in the first aspect. Details are not described herein again.

According to a third aspect, this application provides an access point of an access point multi-link device. The access point of the access point multi-link device has some or all functions of the first AP that is of the AP MLD and that implements in the method example in the first aspect. For example, the access point of the access point multi-link device may have functions in some or all embodiments of this application, or may have a function of independently implementing any embodiment of this application. The function may be implemented by hardware, or may be implemented by hardware executing corresponding software. The hardware or the software includes one or more units or modules corresponding to the functions.

In an implementation, a structure of the access point of the access point multi-link device may include a processing unit and a communication unit. The processing unit is configured to support the access point of the access point multi-link device in performing a corresponding function in the foregoing method. The communication unit is configured to support communication between the access point of the access point multi-link device and another device. The access point of the access point multi-link device may further include a storage unit. The storage unit may be coupled to the processing unit and a sending unit, and the storage unit stores a computer program and data that are necessary for the access point of the access point multi-link device.

In an implementation, the access point of the access point multi-link device includes:

the processing unit, configured to generate group addressed traffic indication information, where the group addressed traffic indication information indicates whether one or more APs of the AP MLD have a group addressed traffic; and the communication unit, configured to send the group addressed traffic indication information.

It can be learned that, in the access point of the access point multi-link device, the group addressed traffic indication information generated by the processing unit can indicate whether the access point or another AP has a group addressed traffic, and then the communication unit sends the group addressed traffic indication information to a station multi-link device. In this way, any station of the station multi-link device can listen to the group addressed traffic indication information. This improves flexibility of a group addressed traffic notification. In addition, if the group addressed traffic indication information indicates whether each AP or multiple APs of the AP MLD have a group addressed traffic, any station of the station multi-link device can learn whether the multiple APs have a group addressed traffic. Therefore, not all stations of the station multi-link device need to listen to whether there is a group addressed traffic on a respective link. This reduces power consumption of the station multi-link device.

In an example, the processing unit may be a processor, the communication unit may be a transceiver or a communication interface, and the storage unit may be a memory.

In another implementation, the access point of the access point multi-link device includes:

the processor, configured to generate group addressed traffic indication information, where the group addressed traffic indication information indicates whether one or more APs of an AP MLD have a group addressed traffic; and the transceiver, configured to send the group addressed traffic indication information.

It can be learned that, in the access point of the access point multi-link device, the group addressed traffic indication information generated by the processor can indicate whether the access point or another AP has a group addressed traffic, and then the transceiver sends the group addressed traffic indication information to a station multi-link device. In this way, any station of the station multi-link device can listen to the group addressed traffic indication information. This improves flexibility of a group addressed traffic notification. In addition, if the group addressed traffic indication information indicates whether each AP or multiple APs of the AP MLD have a group addressed traffic, any station of the station multi-link device can learn whether the multiple APs have a group addressed traffic. Therefore, not all stations of the station multi-link device need to listen to whether there is a group addressed traffic on a respective link. This reduces power consumption of the station multi-link device.

Optionally, the access point of the access point multi-link device may further perform any one or more implementations of the first aspect. Details are not described herein again.

According to a fourth aspect, this application further provides a station of a station multi-link device. The station of the station multi-link device has some or all functions of the first STA that is of the STA MLD and that implements the method example in the second aspect. For example, the station of the station multi-link device may have functions in some or all embodiments of this application, or may have a function of independently implementing any embodiment of this application. The function may be implemented by hardware, or may be implemented by hardware executing corresponding software. The hardware or the software includes one or more units or modules corresponding to the functions.

In an implementation, a structure of the station of the station multi-link device may include a processing unit and a communication unit. The processing unit is configured to support the station of the station multi-link device in performing a corresponding function in the foregoing method. The communication unit is configured to support communication between the station of the station multi-link device and another device. The station of the station multi-link device may further include a storage unit. The storage unit may be coupled to the processing unit and a sending unit, and the storage unit stores a computer program and data that are necessary for the station of the station multi-link device.

In an implementation, the station of the station multi-link device includes:

the communication unit, configured to receive group addressed traffic indication information from an AP MLD, where the group addressed traffic indication information indicates whether one or more APs of the AP MLD have a group addressed traffic.

Optionally, the station of the station multi-link device further includes the processing unit.

The processing unit is configured to determine, based on the group addressed traffic indication information, whether the one or more APs have a group addressed traffic.

It can be learned that, in the station of the station multi-link device, the processing unit may learn, based on the group addressed traffic indication information, whether the one or more APs have a group addressed traffic. To be specific, the station of the station multi-link device can not only learn whether an AP associated with the station has a group addressed traffic, but also learn whether another AP of the AP MLD has a group addressed traffic. This improves flexibility of a group addressed traffic notification. In addition, the group addressed traffic indication information indicates whether multiple APs or each AP of the AP MLD have or has a group addressed traffic. That is, any STA of the station multi-link device can learn whether the multiple APs or each AP of the AP MLD have or has a group addressed traffic. Therefore, not all STAs of the STA MLD need to listen to whether a corresponding AP has a group addressed traffic. This reduces power consumption of the STA MLD.

In an example, the processing unit may be a processor, the communication unit may be a transceiver or a communication interface, and the storage unit may be a memory.

In another implementation, the station of the station multi-link device includes:

the transceiver, configured to receive group addressed traffic indication information from an AP MLD, where the group addressed traffic indication information indicates whether one or more APs of the AP MLD have a group addressed traffic.

Optionally, the station of the station multi-link device further includes a processor.

The processor is configured to determine, based on the group addressed traffic indication information, whether the one or more APs have a group addressed traffic.

It can be learned that, in the station of the station multi-link device, the processor may learn, based on the group addressed traffic indication information, whether the one or more APs have a group addressed traffic. To be specific, the station of the station multi-link device can not only learn whether an AP associated with the station has a group addressed traffic, but also learn whether another AP of the AP MLD has a group addressed traffic. This improves flexibility of a group addressed traffic notification. In addition, the group addressed traffic indication information indicates whether multiple APs or each AP of the AP MLD have or has a group addressed traffic. That is, any STA of the STA MLD can learn whether the multiple APs or each AP of the AP MLD have or has a group addressed traffic. Therefore, not all STAs of the STA MLD need to listen to whether a corresponding AP has a group addressed traffic. This reduces power consumption of the STA MLD.

Optionally, the station of the station multi-link device may further perform any one or more implementations of the second aspect. Details are not described herein again.

According to a fifth aspect, an embodiment of the present disclosure provides a computer-readable storage medium, configured to store a computer program. When the computer program runs in a communication apparatus, the communication apparatus performs the multi-link group addressed traffic transmission method according to the first aspect.

According to a sixth aspect, an embodiment of the present disclosure provides a computer-readable storage medium, configured to store a computer program. When the computer program runs in a communication apparatus, the communication apparatus performs the multi-link group addressed traffic transmission method according to the second aspect.

According to a seventh aspect, this application further provides a computer program product including a computer program. When the computer program product runs on a communication apparatus, the communication apparatus is enabled to perform the multi-link group addressed traffic transmission method according to the first aspect.

According to an eighth aspect, this application further provides a computer program product including a computer program. When the computer program product runs on a communication apparatus, the communication apparatus is enabled to perform the multi-link group addressed traffic transmission method according to the second aspect.

According to a ninth aspect, this application provides a chip system. The chip system includes at least one processor and an interface, configured to support any AP of an AP MLD, for example, a first AP, to implement a function in the first aspect, for example, a function of determining or processing at least one of data and information in the foregoing method. In a possible design, the chip system further includes a memory, and the memory is configured to store a computer program and data that are necessary for an AP of the AP MLD. The chip system may include a chip, or may include a chip and another discrete component.

According to a tenth aspect, this application provides a chip system. The chip system includes at least one processor and an interface, configured to support any STA of a STA MLD, for example, a first STA, to implement a function in the second aspect, for example, a function of determining or processing at least one of data and information in the foregoing method. In a possible design, the chip system further includes a memory, and the memory is configured to store a computer program and data that are necessary for a STA of the STA MLD. The chip system may include a chip, or may include a chip and another discrete component.

BRIEF DESCRIPTION OF DRAWINGS

FIG. 5b is a schematic diagram of a capability information field in a multi-link group addressed traffic transmission method according to an embodiment of this application;

FIG. 5c is a schematic diagram of another capability information field in a multi-link group addressed traffic transmission method according to an embodiment of this application;

FIG. 10 is a schematic diagram of a frame format of a BSSID element according to an embodiment of this application;

FIG. 11 is a schematic diagram of a structure of a communication apparatus 100 according to an embodiment of this application;

FIG. 12 is a schematic diagram of a structure of a communication apparatus 200 according to an embodiment of this application;

DESCRIPTION OF EMBODIMENTS

Figure 1:
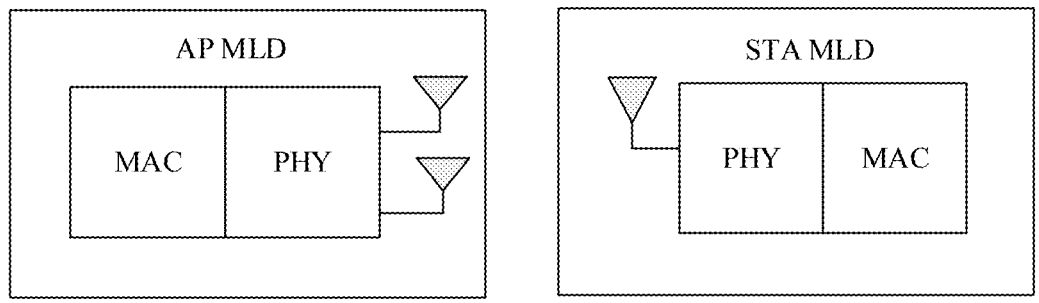
FIG. 1 is a schematic diagram of structures of an AP MLD and a STA MLD according to an embodiment of this application.

The following clearly and completely describes the technical solutions in embodiments of this application with reference to the accompanying drawings in embodiments of this application.

To better understand a multi-link group addressed traffic transmission method and a related apparatus that are disclosed in embodiments of this application, related concepts in embodiments of this application are first described.

1. Multi-Link Device

A wireless communication system applicable to embodiments of this application may be a wireless local area network (Wireless local area network, WLAN) or a cellular network. A group addressed traffic transmission method may be implemented by a communication device in the wireless communication system or a chip or a processor in the communication device. The communication device may be a wireless communication device that supports concurrent transmission performed on multiple links. For example, the communication device is referred to as a multi-link device (Multi-link device) or a multi-band device (multi-band device). Compared with a device that supports only single-link transmission, the multi-link device has higher transmission efficiency and a higher throughput.

The multi-link device includes one or more affiliated stations STAs (affiliated STAs). The affiliated STA is a logical station and may work on one link. The affiliated station may be an access point (Access Point, AP) station or a non-access point station (non-Access Point Station, non-AP STA). For ease of description, in this application, a multi-link device whose affiliated station is an AP may be referred to as a multi-link AP, a multi-link AP device, or an AP multi-link device (AP multi-link device, AP MLD). A multi-link device whose affiliated station is a non-AP STA may be referred to as a multi-link STA, a multi-link STA device, or a STA multi-link device (STA multi-link device, STA MLD). For ease of description, "the multi-link device includes an affiliated STA" is also briefly described as "the multi-link device includes a STA" in embodiments of this application.

It should be noted that the multi-link device includes multiple logical stations, and each logical station works on one link, but the multiple logical stations are allowed to work on a same link.

The multi-link device may implement wireless communication according to 802.11 series protocols. For example, a station complying with an extremely high throughput (EHT), or a station complying with 802.11be or compatible with a station supporting 802.11be implements communication with another device. Certainly, the another device may be a multi-link device, or may not be a multi-link device.

For example, the multi-link device in this embodiment of this application may be a single-antenna device, or may be a multi-antenna device. For example, the multi-link device may be a device with more than two antennas. A quantity of antennas included in the multi-link device is not limited in embodiments of this application. In embodiments of this application, the multi-link device may allow traffics of a same access type to be transmitted on different links, or even allow same data packets to be transmitted on different links. Alternatively, the multi-link device may not allow traffics of a same access type to be transmitted on different links, but may allow traffics of different access types to be transmitted on different links.

For example, the multi-link device is an apparatus with a wireless communication function, and the apparatus may be a device, or may be a chip, a processing system, or the like installed on the device. The device on which the chip or the processing system is installed may implement methods and functions in embodiments of this application under control of the chip or the processing system. For example, the STA MLD in embodiments of this application has a wireless transceiver function, may support the 802.11 series protocols, and may communicate with an AP MLD, another STA MLD, or a single-link device. For example, the STA MLD is any user communication device that allows a user to communicate with an AP and further communicate with a WLAN. For example, the STA MLD may be user equipment that can be connected to a network, such as a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone, may be an Internet of Things node in an Internet of Things, or may be a vehicle-mounted communication apparatus in an Internet of Vehicles. The STA MLD may alternatively be a chip and a processing system in the foregoing terminals.

The AP MLD in embodiments of this application is an apparatus that serves the STA MLD, and may support the 802.11 series protocols. For example, the AP MLD may be a communication entity such as a communication server, a router, a switch, or a bridge, or the AP MLD may include various forms of macro base stations, micro base stations, and relay stations. Certainly, the AP MLD may alternatively be a chip and a processing system in the various forms of devices, to implement the method and the function in embodiments of this application. In addition, the multi-link device may support high-rate and low-latency transmission. With continuous evolution of wireless local area network application scenarios, the multi-link device may be further applied to more scenarios, for example, serving as a sensor node (for example, a smart water meter, a smart electricity meter, or a smart air detection node) in smart city, a smart device (for example, a smart camera, a projector, a display screen, a television, a stereo, a refrigerator, or a washing machine) in smart home, a node in internet of things, an entertainment terminal (for example, AR, VR, or another wearable device), a smart device (for example, a printer, or a projector) in smart office, an internet of vehicles device in internet of vehicles, or infrastructure (for example, a vending machine, a self-service navigation console, a self-check-out device, or a self-service food machine) in daily life scenarios. Specific forms of the STA MLD and the AP MLD are not specifically limited in embodiments of this application, and are merely examples for description herein. The 802.11 protocol may be a protocol that supports 802.11be or is compatible with 802.11be.

Frequency bands on which the multi-link device works may include but are not limited to sub 1 GHz, 2.4 GHz, 5 GHz, 6 GHz, and a high frequency 60 GHz.

For example, the multi-link device in embodiments of this application may be a single-antenna device, or may be a multi-antenna device. For example, the multi-link device in embodiments of this application may be a device with more than two antennas. A quantity of antennas included in the multi-link device is not limited in this embodiment of this application. FIG. 1 is a schematic diagram of a structure in which an AP MLD has multiple antennas and a STA MLD has a single antenna. An 802.11 standard focuses on physical layer (Physical layer, PHY) and media access control (Media Access Control, MAC) layer parts in the AP MLD and the STA MLD.

2. Link Identifier

A link identifier represents one station working on one link. In other words, if there is more than one station on one link, more than one link identifier is required to represent the more than one station. A link mentioned below sometimes also represents a station working on the link.

During data transmission, an AP MLD and a STA MLD may use a link identifier to identify a link or a station on a link. Before communication, the AP MLD and the STA MLD may first negotiate or communicate with each other on a correspondence between a link identifier and a link or a station on a link. Therefore, during data transmission, the link identifier is carried without transmitting a large amount of signaling information to indicate a link or a station on a link. This reduces signaling overheads and improves transmission efficiency.

In an example, a management frame sent by the AP MLD when establishing a basic service set (basic service set, BSS), for example, a beacon (beacon) frame, carries one element. The element includes multiple link identifier information fields. The link identifier information field may indicate a correspondence between a link identifier and a station working on a link corresponding to the link identifier. The link identifier information field not only includes the link identifier, but also includes one or more pieces of following information: a media access control (Media Access Control, MAC) address, an operating class, and a channel number. One or more of the MAC address, the operating class, and the channel number may indicate one link. For an AP, a MAC address of the AP is a BSSID (basic service set identifier, basic service set identifier) of the AP. In another example, in a multi-link device association process, the AP MLD and the STA multi-link device negotiate multiple link identifier information fields. The multi-link device association means that one AP of the AP MLD associates with one STA of the STA MLD once. The association may help multiple STAs of the STA MLD associate with multiple APs of the AP MLD, where one STA associates with one AP.

In subsequent communication, the AP MLD or the STA multi-link device identifies or represents a station in the STA multi-link device by using a link identifier. The link identifier may further represent one or more attributes of a MAC address, an operating class, and a channel number of the station. The MAC address may be replaced with an association identifier of the associated AP MLD. Optionally, if multiple stations work on one link, meanings represented by a link identifier (which is a numeric ID) include not only an operating class in which the link is located and a channel number, but also an identifier of a station working on the link, for example, a MAC address of a station or an association identifier (association identifier, AID) of a station.

3. Traffic Indication Map Element

Figure 2:
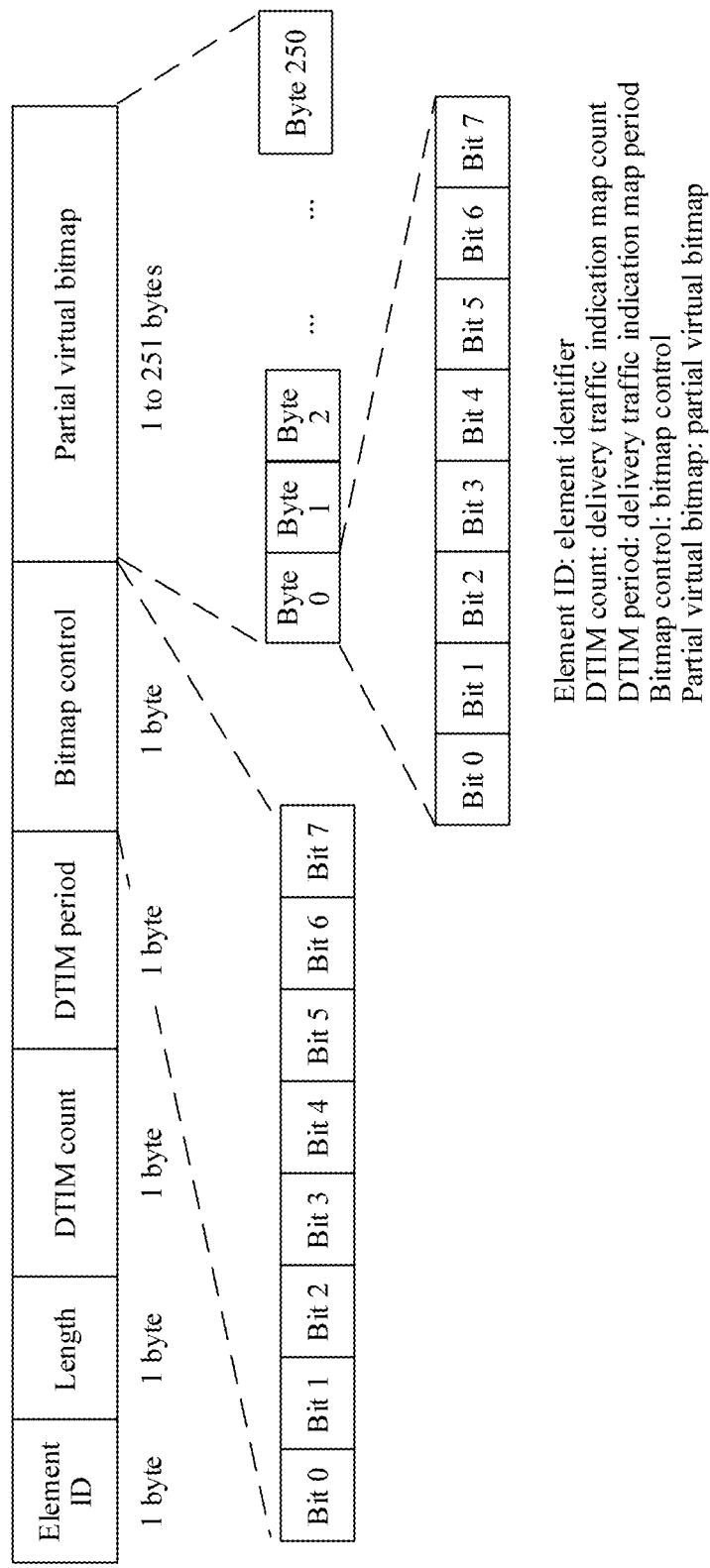
FIG. 2 is a schematic diagram of a frame format of a TIM element according to an embodiment of this application.

A traffic indication map (traffic indication map, TIM) beacon frame and a sent traffic indication map (delivery traffic indication map, DTIM) beacon frame each carry a traffic indication map (traffic indication map, TIM) element. A frame format of a TIM element field is shown in FIG. 2.

Element identifier (identifier, ID) field: The element identifier field is used for identifying that the element shown in FIG. 2 is a TIM element.

Length field: The length field indicates a length of the TIM element, and counts a total length of fields after the length field, to be specific, counts, in bytes, a total length of a DTIM count field, a DTIM period field, a bitmap control field, and a partial virtual bitmap field.

DTIM count (DTIM count) field: The DTIM count field indicates a quantity of remaining TIM beacon frames between a current beacon frame carrying the TIM element and arrival of a next DTIM beacon frame. That is, the DTIM count field is a count value, and the count value is variable. When the value of the DTIM count field is 0, it indicates that the current beacon frame is a DTIM beacon frame. When the value of the DTIM count field is not 0 or is non-zero, it indicates that the current beacon frame is a TIM beacon frame.

DTIM period (DTIM period) field: The DTIM period field indicates period duration of a DTIM beacon frame, namely, an arrival interval. The arrival interval uses a TIM beacon frame period as a unit. For example, if a DTIM period is set to 1, a DTIM count in each TIM element field is equal to 0, in other words, each beacon frame is a DTIM beacon frame.

Bitmap control (Bitmap control) field: As shown in FIG. 2, bit 0 in the bitmap control field indicates whether an access point AP sends a group addressed data traffic after sending a DTIM beacon frame. In other words, bit 0 in the bitmap control field in the DTIM beacon frame indicates whether the AP buffers a group addressed traffic and indicates that the group addressed traffic is not sent by using a group addressed AID. Bits 1 to 7 in the bitmap control field indicate an offset of a partial virtual bitmap (partial virtual bitmap), the offset is in a unit of byte (namely, 8 bits).

Partial virtual bitmap (partial virtual bitmap): Each bit in the partial virtual bitmap field corresponds to one association identifier (association identifier, AID), which indicates whether a station corresponding to the AID has a unicast traffic. Alternatively, each bit in the partial virtual bitmap field corresponds to one group addressed AID, which indicates whether a group of stations corresponding to the group addressed AID have a downlink traffic. The partial virtual bitmap field is a part of bits of a traffic indication virtual bitmap (traffic indication virtual bitmap) field, where the traffic indication virtual bitmap field has 251 bytes, and indicates whether stations corresponding to AID 0 to AID 2007 have a downlink traffic.

The element ID field, the length field, the DTIM count field, the DTIM period field, and the bitmap control field each occupy 1 byte.

Although embodiments of this application are mainly described by using a network in which IEEE 802.11 is deployed as an example, a person skilled in the art easily understands that various aspects of this application can be extended to other networks that use various standards or protocols, for example, BLUETOOTH (Bluetooth), a high performance radio LAN (high performance radio LAN, HIPERLAN) (a wireless standard that is similar to the IEEE 802.11 standard, and is mainly used in Europe), a wide area network (WAN), a wireless local area network (wireless local area network, WLAN), a personal area network (personal area network, PAN), or another known or later developed network. Therefore, the various aspects provided in this application are applicable to any suitable wireless network regardless of coverage and a wireless access protocol.

Figure 3A:
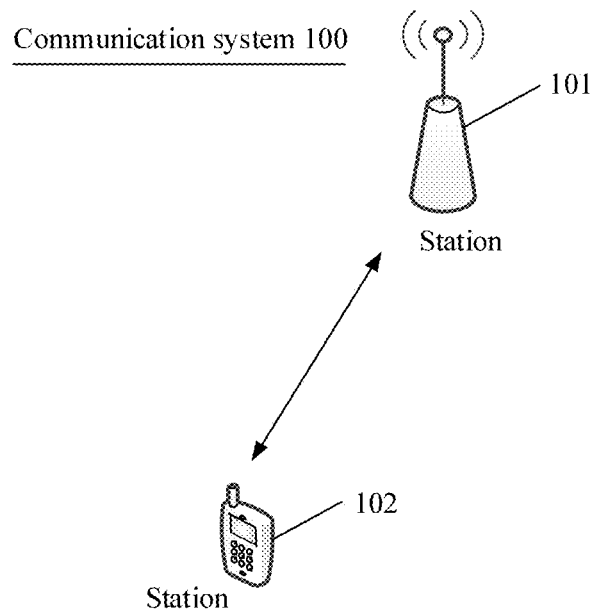
FIG. 3(a) is a schematic diagram of a structure of a communication system 100 according to an embodiment of this application.

A wireless local area network in FIG. 3(a) is used as an example to describe a communication system 100 to which an embodiment of this application is applied. The communication system 100 includes a station 101 and a station 102. The station 101 may communicate with the station 102 over multiple links, to improve a throughput. The station 101 may be a multi-link device, and the station 102 may be a single-link device, a multi-link device, or the like. In a scenario, the station 101 is an AP MLD, and the station 102 is a STA MLD or a station (for example, a single-link station). In another scenario, the station 101 is a STA MLD, and the station 102 is an AP (for example, a single-link AP) or an AP MLD. In still another scenario, the station 101 is an AP MLD, and the station 102 is an AP MLD or an AP. In still another scenario, the station 101 is a STA MLD, and the station 102 is a STA MLD or a STA (for example, a single-link station). Certainly, the wireless local area network may further include another device. A quantity and a type of devices shown in FIG. 3(a) are merely examples.

Figure 3B:
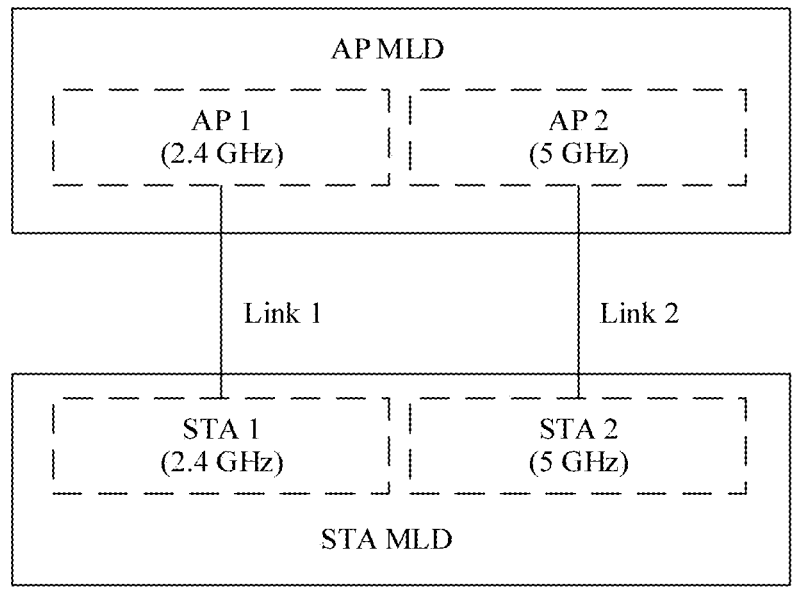
FIG. 3(b) is a schematic diagram of a structure of a communication system 200 according to an embodiment of this application.
Figure 3C:
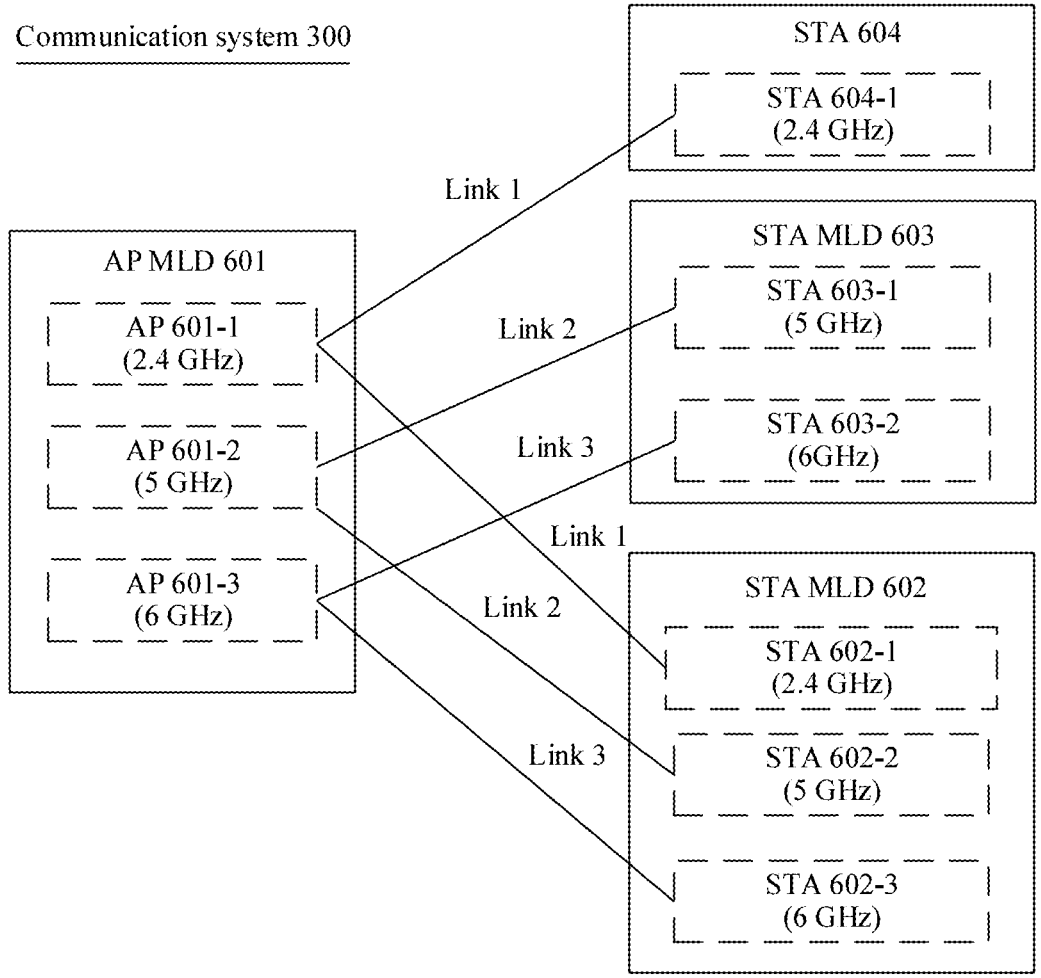
FIG. 3(c) is a schematic diagram of a structure of a communication system 300 according to an embodiment of this application.

FIG. 3(b) and FIG. 3(c) show schematic diagrams of structures of a communication system 200 and a communication system 300. In the communication system 200 and the communication system 300, an example in which a multi-link device in a wireless local area network communicates with another device over multiple links is used.

FIG. 3(b) is a scenario in which an AP MLD communicates with a STA MLD. The AP MLD includes an affiliated AP 1 and an affiliated AP 2. The STA MLD includes an affiliated STA 1 and an affiliated STA 2. The AP MLD and the STA MLD communicate in parallel over a link 1 and a link 2.

FIG. 3(c) is a scenario in which an AP MLD 601 communicates with a STA MLD 602, a STA MLD 603, and a STA 604. The AP MLD 601 includes an affiliated AP 601-1 to an affiliated AP 601-3. The STA MLD 602 includes three affiliated STAs, a STA 602-1, a STA 602-2, and a STA 602-3. The STA MLD 603 includes two affiliated STAs, a STA 603-1 and a STA 603-2. The STA 604-1 and the STA 604 are single-link devices. The AP MLD 601 may separately use a link 1, a link 2, and a link 3 to communicate with the STA MLD 602, use the link 2 and the link 3 to communicate with the STA MLD 603, and use the link 1 to communicate with the STA 604. In an example, the STA 604 works on a 2.4 GHz frequency band. In the STA MLD 603, the STA 603-1 works on a 5 GHz frequency band, and the STA 603-2 works on a 6 GHz frequency band. In the STA MLD 602, the STA 602-1 works on a 2.4 GHz frequency band, the STA 602-2 works on a 5 GHz frequency band, and the STA 602-3 works on a 6 GHz frequency band. The AP 601-1 working on the 2.4 GHz frequency band in the AP MLD 601 may perform, over the link 1, uplink or downlink data transmission with the STA 604 and the STA 602-2 in the STA MLD 602. The AP 601-2 working on the 5 GHz frequency band in the AP MLD 601 may perform, over the link 2, uplink or downlink data transmission with the STA 603-1 working on the 5 GHz frequency band in the STA MLD 603, and may further perform, over the link 2, uplink or downlink data transmission with the STA 602-2 working on the 5 GHz frequency band in the STA MLD 602. The AP 601-3 working on the 6 GHz frequency band in the AP MLD 601 may perform, over the link 3, uplink or downlink data transmission with the STA 602-3 working on the 6 GHz frequency band in the STA MLD 602, and may further perform, over the link 3, uplink or downlink data transmission with the STA 603-2 in the STA MLD.

It should be noted that FIG. 3(b) only shows that the AP MLD supports two frequency bands. FIG. 3(c) shows only an example in which the AP MLD 601 supports three frequency bands (2.4 GHz, 5 GHz, and 6 GHz), each frequency band corresponds to one link, and the AP MLD 601 may work on one or more links of the link 1, the link 2, or the link 3. On an AP side or a STA side, the link herein may be further understood as a station working on the link. In actual application, the AP MLD and the STA MLD may further support more or fewer frequency bands. In other words, the AP MLD and the STA MLD may work on more links or fewer links. This is not limited in this embodiment of this application.

Currently, a single-link device, for example, a station STA in an energy-saving mode, periodically listens to a traffic indication map (traffic indication map, TIM) beacon frame, and determines, based on bit 0 in a bitmap control field in the TIM beacon frame, whether there is a group addressed traffic after a delivery traffic indication map (delivery traffic indication map, DTIM) beacon frame. However, in a multi-link device scenario, it is assumed that bit 0 in a bitmap control field is also used for determining whether there is a group addressed traffic after a DTIM beacon frame. In this case, in the communication systems shown in FIG. 3(a) to FIG. 3(c), each STA of the STA MLDs needs to periodically listen to a TIM beacon frame on a link, and learns whether an AP of the link sends a group addressed traffic after sending a DTIM beacon frame based on a value of bit 0 in the bitmap control field in the TIM beacon frame listened by the STA. If there is a group addressed traffic, the STA receives the group addressed traffic sent by the AP after receiving the corresponding DTIM beacon frame. The group addressed traffic is sent immediately after the DTIM beacon frame, for example, after an SIFS (short inter-frame space, short inter-frame space) time following the DTIM beacon frame.

In an 802.11 protocol, a STA generally has two working modes: a non-power-saving mode and a power-saving mode. When the STA works in the non-power-saving mode, the STA is in an active state (active state, which may also be referred to as an awake state) regardless of whether there is to-be-transmitted data on the STA. When the STA works in the power-saving mode, the STA may be in an active state (active state) when transmitting data with an AP. When there is no data transmission between the STA and the AP, the STA may be in a doze state (doze state) to reduce power consumption. The STA may send a frame to the AP to notify whether the STA is in the power-saving mode. If a power-saving bit in a frame control field (frame control field) in a MAC header of the frame is set to 1, the AP is notified that the STA is in the power-saving mode. If the power-saving bit in the frame control field (frame control field) in the MAC header of the frame is set to 0, the AP is notified that the STA is in the non-power-saving mode.

Figure 4:
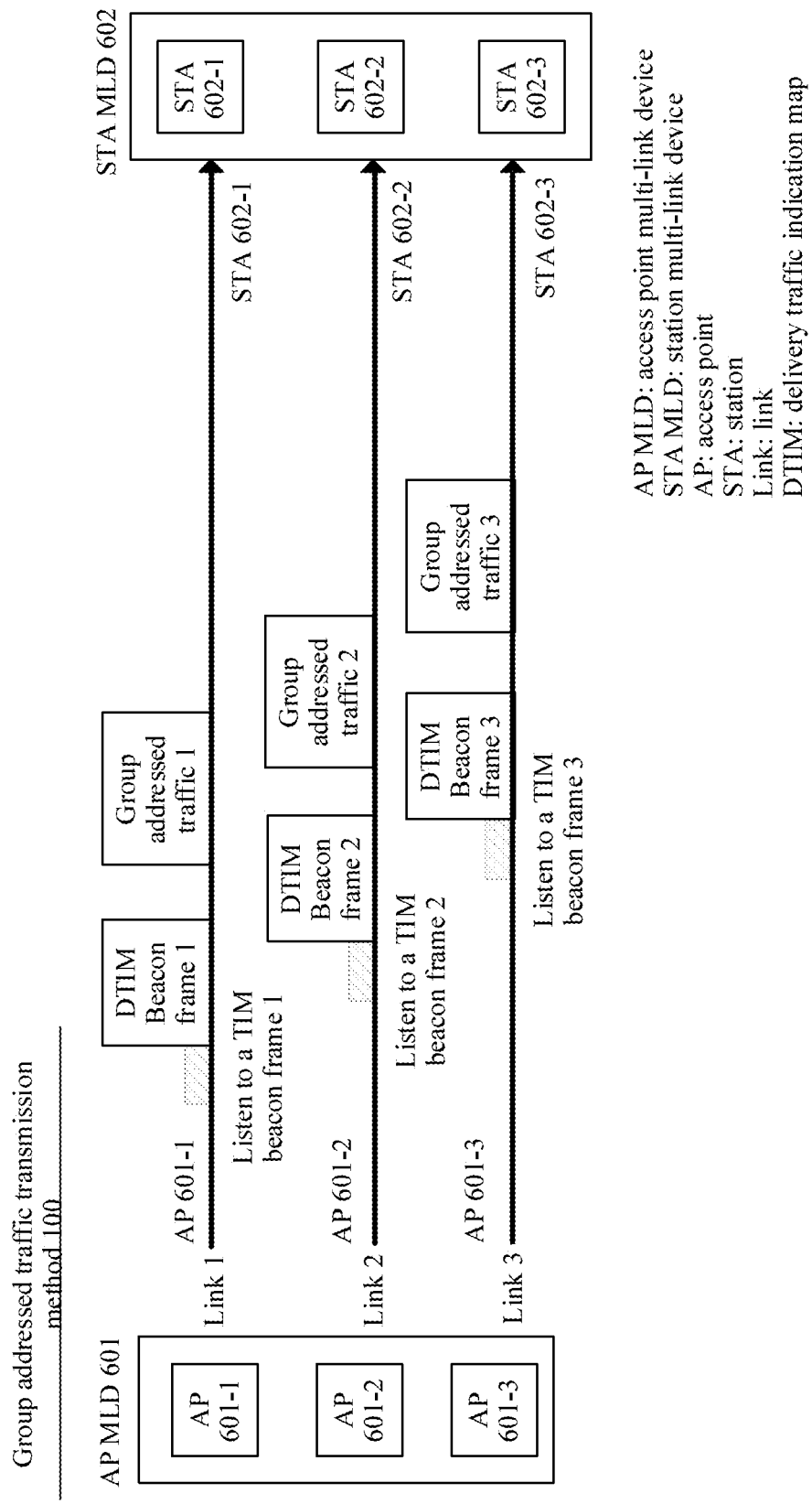
FIG. 4 is a schematic diagram of a group addressed traffic transmission method 100 according to an embodiment of this application.

In a group addressed traffic transmission method 100 shown in FIG. 4, communication between the AP MLD 601 and the STA MLD 602 in FIG. 3(c) is used as an example. The STA 602-1 of the STA MLD 602 needs to listen to a TIM beacon frame 1 on the link 1, to learn, by using bit 0 in a bitmap control field in the TIM beacon frame 1, whether the AP 601-1 sends a group addressed traffic 1 after sending a DTIM beacon frame 1. The STA 602-2 of the STA MLD 602 needs to listen to a TIM beacon frame 2 on the link 2, to learn, by using bit 0 in a bitmap control field in the TIM beacon frame 2, whether the AP 601-2 sends a group addressed traffic 2 after sending a DTIM beacon frame 2. The STA 602-3 of the STA MLD 602 needs to listen to a TIM beacon frame 3 on the link 3, to learn, by using bit 0 in a bitmap control field in the TIM beacon frame 3, whether the AP 601-3 sends a group addressed traffic 3 after sending a DTIM beacon frame 3. It can be learned that, if a quantity of links of the STA MLD 602 keeps increasing, power consumption of the STA MLD 602 increases greatly.

Therefore, how to reduce power consumption of the STA MLD becomes an urgent problem to be resolved.

According to a multi-link group addressed traffic transmission method provided in embodiments of this application, power consumption of a STA MLD can be reduced. The following provides detailed descriptions with reference to the accompanying drawings.

In embodiments of this application, an embodiment 1 and an embodiment 2 are separately described. A difference between the embodiment 1 and the embodiment 2 lies in that the embodiment 1 is described by using an example in which each bit of group addressed traffic indication information indicates whether an AP corresponding to the bit has a group addressed traffic, and the embodiment 2 is described by using an example in which group addressed traffic indication information is a part of bits in a partial virtual bitmap (partial virtual bitmap) field in a TIM element.

Embodiment 1

Figures 5, 5A:
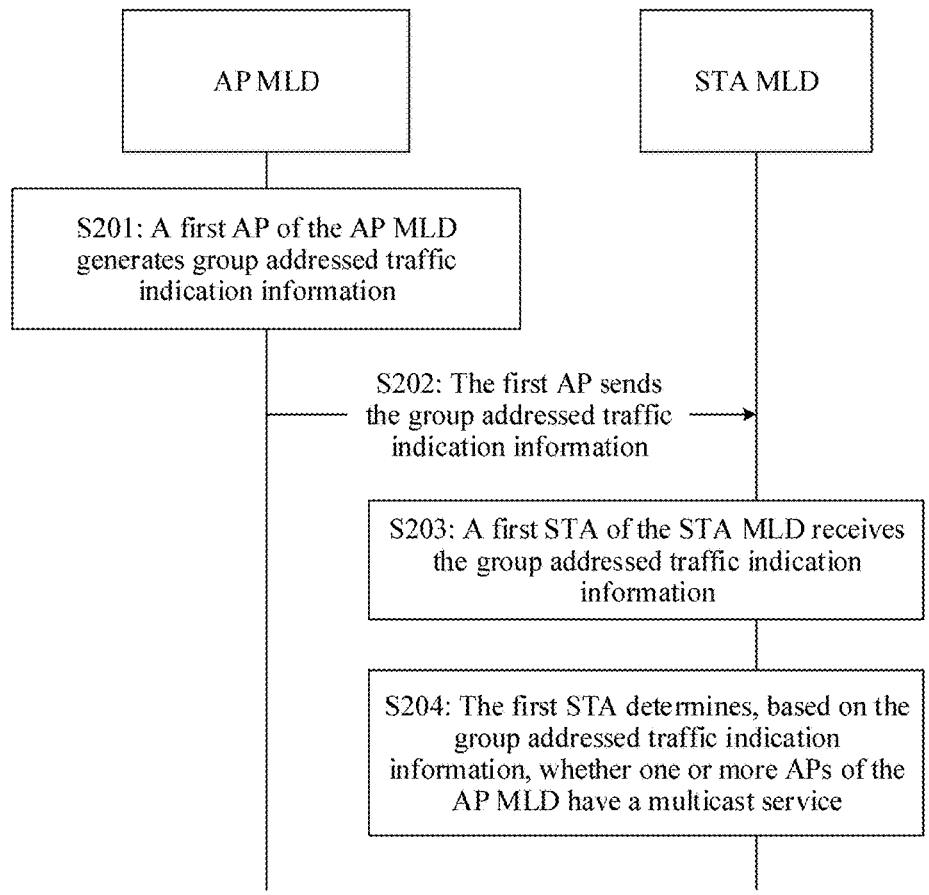
FIG. 5 is a schematic flowchart of a multi-link group addressed traffic transmission method 200 according to an embodiment of this application.
FIG. 5a is a schematic diagram of an MLD parameters field in a multi-link group addressed traffic transmission method according to an embodiment of this application.

FIG. 5 is a multi-link group addressed traffic transmission method 200 according to an embodiment of this application. The multi-link group addressed traffic transmission method 200 is described by using an example in which the method 200 is implemented in a communication system including an AP MLD and a STA MLD. The AP MLD includes one or more APs, and a first AP is any one AP in the one or more APs. The STA MLD includes one or more STAs, and a first STA is any one STA in the one or more STAs. As described above, a multi-link association may be established between the AP MLD and the STA MLD. The multi-link group addressed traffic transmission method 200 may include but is not limited to the following steps:

Step S201: The first AP of the AP MLD generates group addressed traffic indication information.

The first AP is any AP of the AP MLD.

The group addressed traffic indication information may be referred to as a group addressed traffic indication field or a group addressed traffic indication. This is not limited in this embodiment of this application. Description of the group addressed traffic indication information includes the following two expressions: (1) The group addressed traffic indication information indicates whether the one or more APs of the AP MLD have a group addressed traffic. (2) The group addressed traffic indication information indicates whether the one or more APs of the AP MLD send a group addressed traffic after sending a DTIM beacon frame. For another example, description of the group addressed traffic indication information includes the following two expressions: (3) The group addressed traffic indication information indicates whether the one or more APs of the AP MLD buffer a group addressed traffic. (4) The group addressed traffic indication information indicates that a group addressed traffic of the one or more APs of the AP MLD is not sent in a form of a group addressed AID. In this embodiment of this application, expression (1) is used as an example for subsequent description.

On one hand, the group addressed traffic may include a group addressed management frame and a group addressed data frame, where a type of the frame is indicated by a type field identifier of a frame control field in a MAC header. On the other hand, the group addressed traffic may be classified into a broadcast traffic and a multicast traffic. In other words, the group addressed traffic sent by the AP is sent to a station associated with the AP or a station MLD associated with the AP in a broadcast or group addressed manner.

In a same AP MLD, each AP independently sends a group addressed management frame on a link on which the AP works. The AP sends, on the link on which the AP works, a same group addressed data frame to each corresponding STA of a STA MLD associated with the AP. It may be understood that the group addressed management frame is at a link level, and does not need to be received by a conventional station on another link or a STA MLD that has not established an association on the link. This reduces power consumption of a corresponding station. Each AP of the AP MLD sends a same group addressed data frame on each link, so that a station of a single radio (single radio) STA MLD does not lose the group addressed data frame, or a station of a single radio STA MLD does not need to switch a link frequently to receive the group addressed data frame. In an optional implementation, the group addressed traffic indication information indicates whether one AP of the AP MLD has a group addressed traffic. The AP may be the first AP, or may be another AP of the AP MLD other than the first AP. For example, in FIG. 3(*c*), the first AP is the AP 601-1, and group addressed traffic indication information generated by the AP 601-1 may indicate whether the AP 601-2 of the AP MLD 601 has a group addressed traffic. Alternatively, group addressed traffic indication information generated by the AP 601-1 may indicate whether the AP 601-1 of the AP MLD 601 has a group addressed traffic.

In another optional implementation, the group addressed traffic indication information indicates whether multiple APs of the AP MLD have a group addressed traffic. The multiple APs may be a part of APs of the AP MLD, or may be all APs of the AP MLD. For example, in FIG. 3(*c*), the first AP is the AP 601-1, and the AP 601-1 generates group addressed traffic indication information. The group addressed traffic indication information may indicate whether the AP 601-1 of the AP MLD 601 has a group addressed traffic and whether the AP 601-2 has a group addressed traffic. Alternatively, the group addressed traffic indication information may indicate whether the AP 601-1 of the AP MLD 601 has a group addressed traffic, whether the AP 601-2 has a group addressed traffic, and whether the AP 601-3 has a group addressed traffic.

In an optional implementation, each bit of the group addressed traffic indication information corresponds to each AP of the AP MLD. A value of each bit indicates whether an AP corresponding to the bit has a group addressed traffic, or each bit indicates whether an AP corresponding to the bit has a group addressed traffic. Optionally, each bit of the group addressed traffic indication information corresponds to each AP of the AP MLD based on a size of an identifier of a link on which the AP of the AP MLD works. In other words, a bit order of the group addressed traffic indication information corresponds to an order of a link identifier, and the link identifier is an identifier of a link on which each AP of the AP MLD works.

In another implementation, bits of the group addressed traffic indication information are in a one-to-one correspondence with links (or APs of the AP MLD). For example, each bit of the group addressed traffic indication information is used together with each link identifier. Optionally, each bit of the group addressed traffic indication information is located in a target beacon transmission time (target beacon transmission time, TBTT) information field in a reduced neighbor report (Reduced Neighbor Report, RNR) element (element). Specifically, an MLD (multi-link device, multi-link device) parameters subfield (MLD parameters subfield) shown in FIG. 5a is added to the TBTT information field, where the MLD parameters subfield includes a multi-link device identifier (MLD ID), a link identifier (link ID), a change sequence (change sequence), and a group addressed traffic indication. The multi-link device identifier indicates an identifier of an MLD in which a reported AP is located, the link identifier is used for identifying a sequence number of the reported AP of the AP MLD, the change sequence number indicates an updated count value of a key BSS parameter of the reported AP, and the group addressed traffic indication indicates whether the reported AP has a group addressed traffic. The group addressed traffic indication may occupy 1 bit. Optionally, the group addressed traffic may include a group addressed management frame traffic and a group addressed data frame traffic. In an implementation, the group addressed management frame traffic and the group addressed data frame traffic are indicated by two fields. For example, each field occupies 1 bit. Specifically, a group addressed management frame traffic indication and a group addressed data frame traffic indication respectively indicate whether the reported AP has a corresponding group addressed management frame traffic or a corresponding group addressed data frame traffic. In another implementation, only one of a group addressed management frame traffic and a group addressed data frame traffic may be indicated, by using one field. For example, a group addressed management frame traffic indication field indicates whether the reported AP has a corresponding group addressed management frame traffic, or a group addressed data frame traffic indication field indicates whether the reported AP has a corresponding group addressed data frame traffic.

Optionally, the AP that sends the group addressed traffic indication information may still indicate, by using an existing method, that is, bit 0 in a bitmap control field in a TIM element, whether the AP has a downlink group addressed traffic.

Generally, the RNR element is used for enabling an unassociated station to discover an element of a surrounding AP, but an associated station may ignore interpreting the RNR element. Therefore, this embodiment of this application provides a method for indicating whether there is a group addressed traffic indication in the RNR element. To be specific, the method is implemented by using a capability information field in a beacon frame or a probe response frame. A group addressed traffic flag is added to the capability information field to indicate whether at least one reported AP has a group addressed traffic in the RNR element. The group addressed traffic flag may be indicated by using 1 bit. For example, if 1 bit of the group addressed traffic flag is set to 1, it indicates that at least one reported AP has a group addressed traffic. In an equivalent alternative solution, 1 bit may alternatively be set to 0, to indicate that at least one reported AP has a group addressed traffic. As shown in FIG. 5b, the group addressed traffic flag is added to the capability information field in the probe response frame. When the capability information field indicates a value of "there is a group addressed traffic", the associated station or the unassociated station may be indicated to interpret the RNR element. The capability information field shown in FIG. 5b may further include a change sequence number update flag (CSN updated flag), which indicates whether a value of a change sequence number field of the reported AP changes. When the CSN updated flag indicates that a value of a change sequence number field of at least one reported AP changes, the associated station or the unassociated station may be indicated to interpret the RNR element.

Alternatively, in another implementation, as shown in FIG. 5c, an RNR flag is added to a capability element, to indicate whether a value of a change sequence number field of at least one reported AP changes or whether there is a group addressed traffic, in other words, indicate a station to interpret the RNR element. The RNR flag may be indicated by 1 bit. When a value of the RNR flag is set to 1, it indicates that at least one reported AP "has a group addressed traffic" or indicates that a value of a change sequence number field of at least one reported AP changes, to indicate the associated station or the non-associated station to interpret the RNR element. Certainly, in an equivalent alternative solution, the value of the RNR flag herein is set to 1. Alternatively, the value of the RNR flag may be set to 0 to indicate that at least one reported AP "has a group addressed traffic" or indicate that a value of a change sequence number field of at least one reported AP changes.

In the two implementations shown in FIG. 5b and FIG. 5c, the capability information field further includes an ESS (extended service set, extended service set) field, an IBSS (independent basic service set, independent basic service set) field, a privacy (privacy) field, Short Preamble (short preamble) field, a spectrum management (spectrum management) field, a QoS (quality of service, quality of service) field, a short Slot Time (short slot time) field, an APSD (automatic power save delivery field, an automatic power interpretation and transfer) field, a radio Measurement (wireless management) field and an EPD (Ethertype Protocol Discrimination, Ethernet protocol identification) field. For details, see the protocol 802.11REVmd D 3.0. At a station end, for example, an associated station or an associated station MLD, whether to parse the RNR element may be selected by using a beacon frame, the 1-bit group addressed traffic flag or the 1-bit RNR flag added to the capability element in the probe response frame, or the RNR element is always being parsed by default.

For better understanding of this embodiment of this application, the RNR element mentioned in the foregoing embodiment is described as follows:

Reduced neighbor report element (Reduced Neighbor Report element): An AP includes the reduced neighbor report element in a management frame, for example, a beacon frame or a probe response frame. During scanning, a STA receives a management frame sent by the AP, obtains information about surrounding APs based on the reduced neighbor report element in the management frame, and then selects an appropriate AP for association.

Figure 5D:
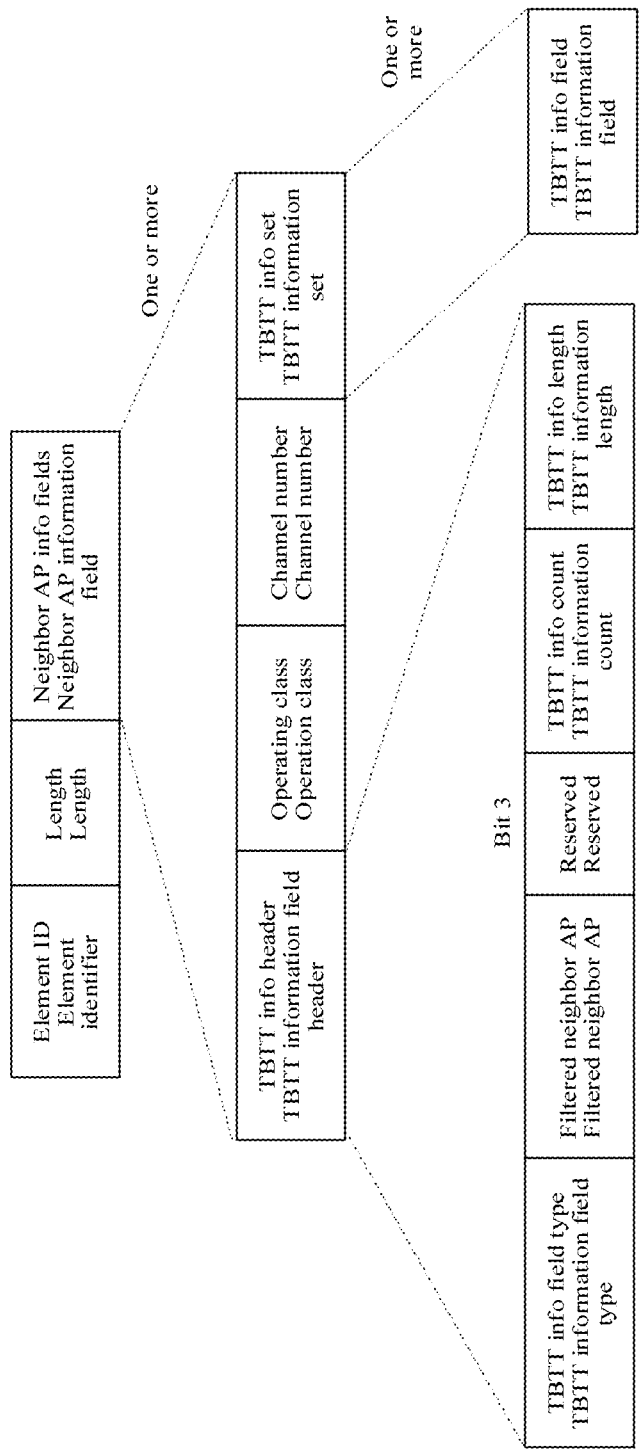
FIG. 5d is a schematic diagram of an RNR element in a multi-link group addressed traffic transmission method according to an embodiment of this application.

Specifically, the RNR element generally carries one or more neighbor AP information (Neighbor AP info) fields, to describe information about one or more neighbor APs and BSSs to which the neighbor APs belong. The information is referred to as reduced information of the neighbor APs below. FIG. 5d shows an indication format. Fields included in the reduced neighbor report element are shown in the figure.

A TBTT information header (a target beacon transmission time (target beacon transmission time, TBTT) info Header) field carries the following information:

TBTT information field type (TBTT info Field Type) field: The TBTT information field type field indicates a type of TBTT information (TBTT info). The TBTT information field type indicates a format of a TBTT info field together with a TBTT information length (TBTT info length) field.

Filtered neighbor AP (Filtered neighbor AP) field: The filtered neighbor AP field indicates whether SSIDs of all BSSs carried in the neighbor AP information (Neighbor AP info) field match SSIDs in a probe request frame.

Reserved (Reserved) field (1 bit).

TBTT information count (TBTT info count) field: The TBTT information count field indicates a quantity of TBTT information fields (TBTT info field) included in a TBTT information set (TBTT info set).

TBTT information length (TBTT info Length) field: The TBTT information length field indicates a length of each TBTT info field. Table 1 shows formats of carried specific information of different lengths.

TABLE 1

| TBTT information length (byte) | Content carried in a TBTT information field |
| --- | --- |
| 1 | Neighbor AP TBTT offset field |
| 2 | Neighbor AP TBTT offset field and BSS parameter field |
| 5 | Neighbor AP TBTT offset field and short SSID field |
| 6 | Neighbor AP TBTT offset field, short SSID field, and BSS parameter field |
| 7 | Neighbor AP TBTT offset field and BSSID field |
| 8 | Neighbor AP TBTT offset field, BSSID field, and BSS parameter field |
| 11 | Neighbor AP TBTT offset field, BSSID field, and short SSID field |
| 12 | Neighbor AP TBTT offset field, BSSID field, short SSID field, and BSS parameter field |
| 13 | Neighbor AP TBTT offset field, BSSID field, short SSID field, BSS parameter field, and 20 MHz power spectrum density field |
| 0, 9 and 10 | Reserved |
| 14 to 255 | Reserved, but information about first 13 bytes is the same as the fields carried when the TBTT information length is 13. |

Figure 5E:
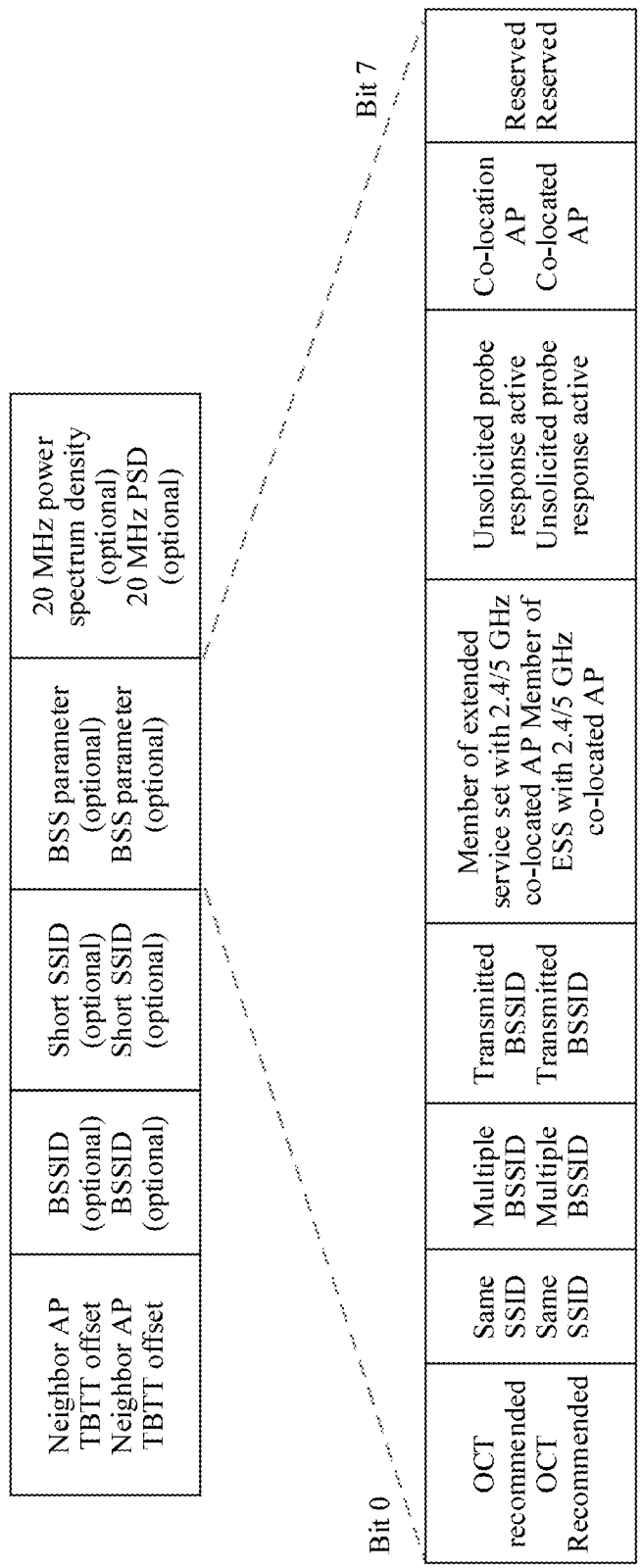
FIG. 5e is a schematic diagram of a TBTT information field in a multi-link group addressed traffic transmission method according to an embodiment of this application.

The following provides a specific format of the TBTT information (TBTT info) field when the TBTT information length is 12 bytes, as shown in FIG. 5e.

Neighbor AP target beacon transmission time offset (Neighbor AP TBTT offset) field: The neighbor AP TBTT offset field indicates an offset of beacon sending time between a neighbor AP and a reporting AP.

BSS identifier (BSSID) field: The BSS identifier field indicates a BSS identifier corresponding to the neighbor AP.

Short service set identifier (Short SSID) field: The short service set identifier field indicates a service set identifier to which the neighbor AP belongs.

20 MHz power spectrum density indicates default transmission power, which is power spectrum density (power spectrum density, PSD) equivalent isotropically radiated power (equivalent isotropically radiated power, EIRP) whose unit is dBm/MHz.

BSS parameter (BSS Parameter) field: The BSS parameter field indicates a related parameter of the neighbor AP. As shown in FIG. 5e, the BSS parameter (BSS Parameter) field includes the following information:

On-channel tunneling mechanism recommended (OCT recommended) field: The on-channel tunneling mechanism recommended indicates that the neighbor AP expects to exchange an MPDU of a management type with the reporting AP by using the OCT mechanism.

Same service set identifier (Same SSID) field: The same service set identifier indicates whether the neighbor AP and the reporting AP have a same SSID.

Multiple basic service set identifier (Multiple BSSID) field: The multiple basic service set identifier indicates whether the neighbor AP belongs to a part of a multiple BSSID set.

Transmitted basic service set identifier (Transmitted BSSID) field: The transmitted basic service set identifier indicates whether the neighbor AP is a transmitted BSSID or a nontransmitted BSSID if the neighbor AP is a part of the multiple BSSID set.

Member of extended service set with 2.4/5 GHz co-located AP (Member Of ESS With 2.4/5 GHz Co-Located AP) field: The member of extended service set with 2.4/5 GHz co-located AP field indicates whether the neighbor AP shares a location with a 2.4/5 GHz AP (in other words, whether the neighbor AP is a 6 GHz only AP) and indicates that the neighbor AP is a member of an extended service set.

Unsolicited probe response active (Unsolicited Probe Response Active) field: The unsolicited probe response active field indicates whether the neighbor AP enables an active probe response.

Co-located AP (Co-located AP) field: The co-located AP field indicates whether the neighbor AP and the reporting AP are co-located.

For example, the AP MLD 601 includes three APs, the group addressed traffic indication information has 3 bits, and the 3 bits respectively correspond to the three APs in descending order of identifiers of links on which the three APs work. It is assumed that the identifiers of the links on which the three APs work are as follows: If a link identifier of the AP 601-1 is 3, a link identifier of the AP 601-2 is 2, and a link identifier of the AP 601-3 is 1, a first bit of the group addressed traffic indication information corresponds to the AP 601-1, a second bit of the group addressed traffic indication information corresponds to the AP 601-2, and a third bit of the group addressed traffic indication information corresponds to the AP 601-3. If the group addressed traffic indication information is 011, it indicates that the AP 601-1 has no group addressed traffic, and the AP 601-2 and the AP 601-3 have group addressed traffics. Certainly, the 3 bits may also respectively correspond to the three APs in ascending order of identifiers of the links on which the three APs work.

In an optional implementation, a quantity of bits of the group addressed traffic indication information may alternatively be a fixed value. In the fixed quantity of bits, a bit other than bits corresponding to a quantity of APs may be set to zero by default. For example, the fixed quantity of bits is 4 bits, where three most significant bits correspond to three APs in the AP MLD, and one subsequent bit is set to zero. That is, the fixed number of bits may be greater than the quantity of APs of the AP MLD.

S202: The first AP sends the group addressed traffic indication information.

S203: The first STA of the STA MLD receives the group addressed traffic indication information.

The first STA is a station managed by the first AP or a surrounding station. Stations surrounding the first AP include the station managed by the first AP and an unassociated station. The following describes the group addressed traffic transmission method in this embodiment of this application by using the station managed by the AP as an example. Optionally, the first STA may be any station of the STA MLD, and may learn whether each AP or a part of APs of the AP MLD have a group addressed traffic. Therefore, any station of the STA MLD may receive the group addressed traffic indication information from an AP associated with the station.

S204: The first STA determines, based on the group addressed traffic indication information, whether one or more APs in the AP MLD have a group addressed traffic.

In an implementation, the multi-link group addressed traffic transmission method further includes: For an AP with a group addressed traffic of the AP MLD, the AP may send the group addressed traffic after sending a next to-be-sent DTIM beacon frame after the group addressed traffic indication information. Correspondingly, a station working on a link of the AP of the STA MLD may receive the DTIM beacon frame on the link, and receive the subsequent group addressed traffic. Specifically, the station of the STA MLD working on the link of the AP may receive and parse a group addressed management frame after the DTIM beacon frame on the link, and discard a group addressed data frame after a DTIM beacon frame on a link other than a link on which the first STA is located. In this case, the first STA of the STA MLD has received a corresponding group addressed data frame on the link of the first STA. Optionally, the DTIM frame is a next DTIM beacon frame after the group addressed traffic indication information. Optionally, if the first AP also has a group addressed traffic, the first AP may send the group addressed traffic after sending a next to-be-sent DTIM beacon frame after the group addressed traffic indication information. Correspondingly, the first STA may receive the DTIM beacon frame after the group addressed traffic indication information, and receive the group addressed traffic after the DTIM beacon frame.

In this embodiment of the present disclosure, the group addressed traffic indication information may be carried in a management frame, for example, a beacon frame, a TIM frame, a data frame, a control frame, or another frame.

Optionally, the group addressed traffic indication information may be located in a DTIM beacon frame, and the beacon frame is a DTIM beacon frame in which the group addressed traffic indication information is located. In other words, for the beacon frame, the group addressed traffic indication information sent by the first AP may be located only in the DTIM beacon frame. Specifically, for an AP that has a group addressed traffic and that is of the AP MLD, the AP may send the group addressed traffic after sending a next to-be-sent DTIM beacon frame after the group addressed traffic indication information. Correspondingly, a station corresponding to the AP learns, based on the group addressed traffic indication information, that the AP has the group addressed traffic, and may receive the DTIM beacon frame and receive the group addressed traffic after receiving the DTIM beacon frame. Specifically, the station of the STA MLD working on the link of the AP may receive and parse a group addressed management frame after the DTIM beacon frame on the link, and discard a group addressed data frame after a DTIM beacon frame on a link other than a link on which the first STA is located. In this case, the first STA of the STA MLD has received a corresponding group addressed data frame on the link of the first STA. Optionally, if the first AP also has a group addressed traffic, the first AP may send the group addressed traffic after the DTIM beacon frame that carries the group addressed traffic indication information. Correspondingly, the first STA may receive the group addressed traffic after the DTIM beacon frame that carries the group addressed traffic indication information.

For example, it is assumed that in the communication system 300 shown in FIG. 3(*c*), group addressed traffic indication information sent by the AP 601-2 in the AP MLD 601 is 111, a first bit of the group addressed traffic indication information corresponds to the AP 601-1, a second bit of the group addressed traffic indication information corresponds to the AP 601-2, and a third bit of the group addressed traffic indication information corresponds to the AP 601-3. As shown in FIG. 3(*c*), the AP 601-2 communicates with the STA 603-1 in the STA MLD 603 and the STA 602-2 in the STA MLD 602 over the link 2. Therefore, the STA 603-1 and the STA 602-2 may listen and detect that the group addressed traffic indication information sent by the AP 601-2 is 111.

In an implementation, the STA 602-2 may determine that the AP 601-1, the AP 601-2, and the AP 601-3 each have a group addressed traffic. Further, the STA 602-1 working on the link 1 of the AP 601-1 in the STA MLD 602 listens to a DTIM beacon frame 1 and a subsequent group addressed traffic 1. The STA 602-2 working on link 2 of the AP 601-2 in the STA MLD 602 listens to a DTIM beacon frame 2 and a subsequent group addressed traffic 2. The STA 602-3 working on the link 3 of the AP 601-3 in the STA MLD 602 listens to a DTIM beacon frame 3 and a subsequent group addressed traffic 3.

In another implementation, if the group addressed traffic indication information is carried in a DTIM beacon frame, the STA 602-2 that receives the DTIM beacon frame may receive a group addressed traffic after the DTIM beacon frame. Another STA of the STA MLD 602 further needs to receive a DTIM beacon frame and a subsequent group addressed traffic on its respective link.

Optionally, the STA 604 may alternatively listen to the group addressed traffic indication information on the link 1. However, if the STA 604 does not care about whether other APs indicated by the group addressed traffic indication information have a group addressed traffic, the STA 604 may not receive the group addressed traffic of these APs. If the STA 604 cares about whether other APs indicated by the group addressed traffic indication information have a group addressed traffic, for example, if the STA 604 has a frequency band selection and receiving capability, the STA 604 may learn, based on the group addressed traffic indication information, whether the other APs have the group addressed traffics.

For the STA MLD 603, the STA 603-1 may determine that the AP 601-1, the AP 601-2, and the AP 601-3 each have a group addressed traffic, where the STA MLD 603 has no station working on the link 1 of the AP 601-1. Therefore, the STA 603-1 working on the link 2 of the AP 601-2 in the STA MLD 603 listens to a DTIM beacon frame 2 and a subsequent group addressed traffic 2. The STA 603-2 working on the link 3 of the AP 601-3 in the STA MLD 603 listens to a DTIM beacon frame 3 and a subsequent group addressed traffic 3.

In another implementation, if the group addressed traffic indication information is carried in a DTIM beacon frame, the STA 603-1 that receives the DTIM beacon frame may receive a group addressed traffic after the DTIM beacon frame. Another STA of the STA MLD 603 further needs to receive a DTIM beacon frame and a subsequent group addressed traffic on its respective link.

It should be noted that listening mentioned in the present disclosure may also be understood as receiving.

Figure 6:
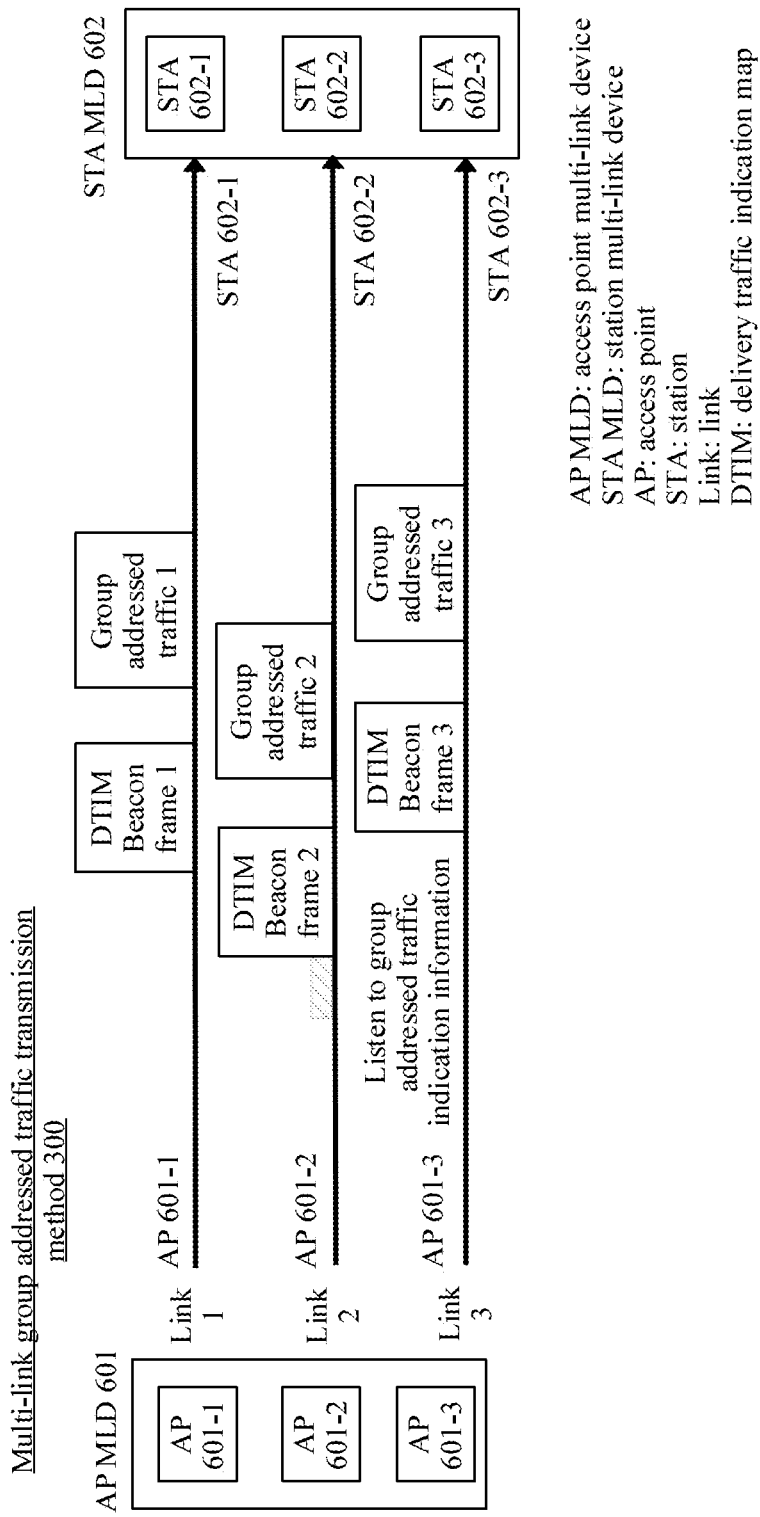
FIG. 6 is a schematic diagram of a multi-link group addressed traffic transmission method 300 according to an embodiment of this application.

FIG. 6 shows a multi-link group addressed traffic transmission method 300 between the AP MLD 601 and the STA MLD 602 in this example. As shown in FIG. 6, the STA MLD 602 may use the STA 602-2 to listen to group addressed traffic indication information sent by the AP 601-2, to learn whether the AP 601-1 and the AP 601-3 have a group addressed traffic. In the group addressed traffic transmission method 100 shown in FIG. 4, each STA of the STA MLD 602 needs to listen to a TIM beacon frame sent by the AP MLD 601 on a respective link to learn, by using the TIM beacon frame, whether the AP MLD 601 sends a group addressed traffic after the DTIM beacon frame. Compared with the method 100, this method greatly reduces power consumption of the STA MLD 602.

It can be learned that in this embodiment of this application, a first AP of an AP MLD may generate and send group addressed traffic indication information, where the group addressed traffic indication information can indicate whether an AP of the AP MLD has a group addressed traffic. The AP may be the first AP or an AP other than the first AP of the AP MLD, so that a STA of a STA MLD may learn whether an AP associated with the STA has a group addressed traffic, or whether another AP of the AP MLD has a group addressed traffic. Compared with a manner in which each STA of the STA MLD can only listen to whether an AP associated with the STA has a group addressed traffic, in this embodiment of this application, flexibility of notifying a group addressed traffic by the AP MLD can be improved.

In this embodiment of this application, the first AP of the AP MLD may generate and send the group addressed traffic indication information. The group addressed traffic indication information can indicate whether each AP or a part of APs in multiple APs of the AP MLD have a group addressed traffic, so that one station of the STA MLD can learn whether the multiple APs have a group addressed traffic. Compared with a manner in which each STA of the STA MLD can only listen to whether an AP associated with the STA has a group addressed traffic, in this embodiment of this application, power consumption of the STA MLD can be reduced.

In this embodiment of this application, one or more APs in the AP MLD may send group addressed traffic indication information, and one or more STAs in the STA MLD may listen to the group addressed traffic indication information. The following describes optional implementations.

Case 1: An AP that sends group addressed traffic indication information and a STA that listens to the group addressed traffic indication information In an optional implementation, each AP of the AP MLD sends group addressed traffic indication information, and any STA of the STA MLD may listen to group addressed traffic indication information on one link. Alternatively, any multiple STAs of the STA MLD listen to group addressed traffic indication information on a link on which each STA works. For example, in FIG. 3(c), the AP 601-1 and the AP 601-3 may also perform steps S201 and S202, and each send group addressed traffic indication information. Any one or more STAs in the STA MLD 602 may listen to the group addressed traffic indication information on a corresponding link. An AP corresponding to each bit in the group addressed indication information sent by each AP is fixed. If multiple STAs in the STA MLD 602 listen to group addressed traffic indication information on a corresponding link, the multiple STAs may be all STAs or a part of STAs of the STA MLD. It can be learned that, in this implementation, flexibility of listening to group addressed traffic indication information by the STA MLD is greatly improved. In addition, one or a part of STAs in the STA MLD listen to the group addressed traffic indication information, so that power consumption of the STA MLD can also be reduced to some extent.

In another optional implementation, the first STA in steps S203 and S204 may be a station working on a primary link in the STA MLD, and the first STA of the STA MLD listens to group addressed traffic indication information sent by an AP working on the primary link.

In still another optional implementation, the first STA in steps S203 and S204 is a station working on a primary link in the STA MLD. Optionally, the STA MLD may notify the AP MLD of a primary link on which the STA MLD works. For example, the station on the primary link in the STA MLD notifies, of a link identifier of the station, an AP corresponding to the STA in the AP MLD. In this way, an AP working on the primary link in the AP MLD sends group addressed traffic indication information, and another AP may not send group addressed traffic indication information. This helps reduce power consumption of the AP MLD or helps the AP MLD send the group addressed traffic indication information more effectively, for example, repeatedly send the group addressed traffic indication information on multiple links.

The following describes an implementation of how the AP MLD learns the primary link on which the STA MLD works.

In an implementation, the AP MLD may obtain identifier information of the primary link determined by the STA MLD. For example, the identifier information of the primary link may include one or more of the following information: an operating class (operating class) and a channel number (channel number) that correspond to the primary link, or a MAC address (or BSSID) of the primary link, or an identifier (identifier, ID) of the primary link. Specific content included in the identifier information of the primary link is not limited in this embodiment of this application. Any information that can be used for uniquely identifying one station working on the primary link may be the identifier information of the primary link described in this embodiment of this application. The MAC address of the primary link may be a MAC address of a STA working on the primary link, or a MAC address of an AP working on the primary link. When the MAC address of the primary link is the MAC address of the AP working on the primary link, the MAC address of the primary link may also be referred to as a BSSID.

In an implementation, if the AP MLD is not associated with the STA MLD, that the AP MLD obtains identifier information of the primary link may include: The AP MLD receives an association request frame from the STA MLD. A link used by the AP MLD to receive the association request frame is the primary link determined by the STA MLD. Alternatively, the association request frame received by the AP MLD carries link identifier information of the primary link determined by the STA MLD. That is, the AP MLD may determine a station on a link over which the association request frame is received (or a station sending the association request frame) as a link identifier of the primary link. Alternatively, the AP MLD obtains the link identifier information of the primary link carried in the association request frame.

In another implementation, if the AP MLD has been associated with the STA MLD, that the AP MLD obtains link identifier information of the primary link may include: The AP MLD receives a message frame from the STA MLD, where the message frame carries the link identifier information of the primary link determined by the STA MLD. The message frame is a management frame, a data frame, a control frame, or the like.

It may be understood that, in this implementation, the message frame is used for notifying the AP MLD of a changed primary link of the STA MLD. In other words, the identifier information of the primary link carried in the message frame is link identifier information of the changed primary link. Optionally, the management frame may further include a change count, which indicates a countdown before the primary link is changed.

Optionally, the AP MLD may alternatively select a link as the primary link, and the link identifier of the primary link indicates the AP working on the primary link. The AP needs to send the link identifier of the primary link to a station associated with the AP or a surrounding station. In step S201, the first AP is an AP working on the primary link. Therefore, the group addressed traffic indication information sent by the first AP may indicate whether the first AP working on the primary link has a group addressed traffic. Alternatively, the group addressed traffic indication information may indicate whether an AP working on a secondary link has a group addressed traffic. Alternatively, the group addressed traffic indication information may indicate whether the first AP working on the primary link has a group addressed traffic and whether an AP working on a secondary link has a group addressed traffic. The secondary link is a link on which another AP other than the first AP of the AP MLD works, or the secondary link includes a link other than the primary link in multiple links.

In this embodiment of this application, the group addressed traffic indication information sent by the first AP may be a part of or all bits of the group addressed traffic indication information generated by the first AP. If the group addressed traffic indication information sent by the first AP is a part of bits of the group addressed traffic indication information generated by the first AP, signaling overheads can be reduced. The following describes this implementation.

Each bit of the group addressed traffic indication information corresponds to each AP of the AP MLD. If none of APs corresponding to bits before an $N_1^{th}$ bits of the group addressed traffic indication information has a group addressed traffic, and none of the APs corresponding to bits after an $N_2^{th}$ bit has a group addressed traffic, the group addressed traffic indication information sent by the first AP may include only the $N_1^{th}$ bit to the $N_2^{th}$ bit. $N_1$ may be greater than or equal to 0 and less than a total quantity of bits of the generated group addressed traffic indication information. $N_2$ may be greater than $N_1$ and less than or equal to a total quantity of bits of the generated group addressed traffic indication information. It can be learned that this implementation helps reduce signaling overheads. In addition, in this case, the group addressed traffic indication information further includes an offset field and a length field. The offset indicates $N_1$, and the length indicates $N_2-N_1+1$ of the group addressed traffic information.

For ease of description, in the following, group addressed traffic indication information generated by the first AP is referred to as first group addressed traffic indication information, and group addressed traffic indication information sent by the first AP is referred to as second group addressed traffic indication information. The second group addressed traffic indication information may be the same as the first group addressed traffic indication information, or the second group addressed traffic indication information is a part of bits of the first group addressed traffic indication information.

If the second group addressed traffic indication information is a part of bits of the first group addressed traffic indication information, the first AP further needs to send an offset and a length. The offset and the length are used by the first STA of the STA MLD to learn that the second group addressed traffic indication information is bits corresponding to which APs. An offset of the second group addressed traffic indication information relative to the first group addressed traffic indication information is referred to as an offset of the second group addressed traffic indication information for short. If the second group addressed traffic indication information is all bits of the first group addressed traffic indication information, the first AP may send the offset and the length, or may not send the offset and the length.

The first group addressed traffic indication information includes a bit corresponding to each AP of the AP MLD. In addition, a correspondence between each bit of the first group addressed traffic indication information and each AP of the AP MLD may be notified by using the foregoing management frame, or may be predefined based on a size of an identifier of a link on which each AP works. To be specific, a total quantity of bits of the first group addressed traffic indication information may be equal to a total quantity of APs of the AP MLD. Optionally, the AP MLD may determine, based on the size of the identifier of the link on which each AP of the AP MLD works, that each bit of the first group addressed traffic indication information is in a one-to-one correspondence with each AP.

There are two cases below. That is, a case 2.1 and a case 2.2 discuss that the second group addressed traffic indication information is a part of bits of the first group addressed traffic indication information.

Case 2.1: The second group addressed traffic indication information is all bits starting from byte $N_1$ of the first group addressed traffic indication information and ending at byte $N_2$, where $N_1$ is greater than or equal to 0, and $N_2$ is greater than or equal to $N_1$.

It is assumed that none of APs corresponding to all bits from bit 0 to bit $N_1*8-1$ of the first group addressed traffic indication information has a group addressed traffic, and none of APs corresponding to bit $(N_2+1)*8$ and all subsequent bits has a group addressed traffic. In this case, the second group addressed traffic indication information sent by the first AP may be all the bits starting from byte $N_1$ of the first group addressed traffic indication information and ending at byte $N_2$.

In this case, a length of the second group addressed traffic indication information sent by the first AP is $N_2-N_1+1$, and the offset of the second group addressed traffic indication information is $N_1$. Further, the station managed by the first AP in the STA MLD receives the length and the offset, and may determine that the received second group addressed traffic indication information indicates whether APs corresponding to bits $N_1*8$ to bits $((N_2+1)*8-1)$ have a group addressed traffic, determine that APs corresponding to all bits from bit 0 to bit $N_1*8-1$ have no group addressed traffic, and determine that APs corresponding to bit $(N_2+1)*8$ and all subsequent bits have no group addressed traffic.

For example, it is assumed that the first group addressed traffic indication information has 3 bytes, where none of APs corresponding to bits in byte 0 has a group addressed traffic, and none of APs corresponding to bits in byte 2 has a group addressed traffic. In this case, the second group addressed traffic indication information may include only bits in byte 1. In this case, the length of the second group addressed traffic indication information is 1 byte, and the offset is 1 byte. In this way, after receiving the second group addressed traffic indication information, the length, and the offset, the first STA may learn that bits in the second group addressed traffic indication information indicate whether APs corresponding to bit 8 to bit 15 have a group addressed traffic, learn that none of APs corresponding to bits of byte 0 has a group addressed traffic, and learn that none of APs corresponding to bits in byte 2 has a group addressed traffic.

In another implementation, to reduce signaling overheads required for sending the offset, in other words, reduce a quantity of bits required for indicating the offset, the offset of the second group addressed traffic indication information may be set to $N_1/2$. In this case, $N_1$ is required to be an even byte number.

For example, if the offset sent by the first AP is 0 and a length is 1 byte, the second group addressed traffic indication information sent by the first AP includes bit 0 to bit 7 in the first group addressed traffic indication information. In this way, the first STA may learn, based on values of bit 0 to bit 7, whether APs corresponding to bit 0 to bit 7 have a group addressed traffic. If the offset sent by the first AP is 1 and a length is 1 byte, the second group addressed traffic indication information sent by the first AP includes byte 2, namely, bit 16 to bit 22 in the first group addressed traffic indication information. In this way, the first STA may learn, based on values of bit 16 to bit 22, whether APs corresponding to bit 16 to bit 22 have a group addressed traffic.

For another example, it is assumed that the offset sent by the first AP is 0, a length is 1 byte, the second group addressed traffic indication information is 01100110, and bits 0 to 7 respectively correspond to an AP 1 to an AP 8 of the AP MLD. In this case, the first STA may learn that the AP 1, the AP 4, the AP 5, and the AP 8 have no group addressed traffic, and the AP 2, the AP 3, the AP 6, and the AP 7 have group addressed traffics. Optionally, if bit 0 is predefined to be meaningless, that is, bit 0 does not correspond to any AP, bit 1 to bit 7 respectively correspond to the AP 1 to the AP 7 of the AP MLD, and the first STA may learn that the AP 1, the AP 2, the AP 5, and the AP 6 have group addressed traffics, and the AP 3, the AP 4, and the AP 7 have no group addressed traffic.

It can be learned that in the case 1, the correspondence between each AP of the AP MLD and each bit in the first group addressed traffic indication information is determined through predefinition or notification by using a management frame. Further, the second group addressed traffic indication information is a part of bits of the first group addressed traffic indication information, to reduce signaling overheads.

Case 2.2: The second group addressed traffic indication information is bits starting from byte 0 and ending at byte N0−1 of the first group addressed traffic indication information, and bits starting from byte $N_1$ of the first group addressed traffic indication information and ending at byte $N_2$.

In this case, it is assumed that none of APs corresponding to bit N0*8−1 to bit $N_1$*8−1 of the first group addressed traffic indication information has a group addressed traffic, and none of APs corresponding to bit $N_2$*8 and a subsequent bit has a group addressed traffic. In this case, the second group addressed traffic indication information sent by the first AP is bits starting from byte 0 of the first group addressed traffic indication information and ending at byte N0−1, and bits starting from byte $N_1$ of the first group addressed traffic indication information and ending at byte $N_2$.

Correspondingly, a length of the second group addressed traffic indication information sent by the first AP is $N0+N_2-N_1+1$, and the offset of the second group addressed traffic indication information is $N_1-N0$. Further, the station managed by the first AP in the STA MLD receives the length and the offset, and may determine that the received second group addressed traffic indication information indicates bits 0 to bits (N0−1)*8−1, determine whether APs corresponding to bit $N_1$*8+1 to bit $N_2$*8−1 have a group addressed traffic, and determine that none of APs corresponding to bit (N0−1)*8 to bit $(N_1-1)$*8 has a group addressed traffic.

In an implementation, to reduce a quantity of bits required for the offset, the offset of the second group addressed traffic indication information sent by the first AP is ½ of an actual offset. Therefore, in this case, the offset sent by the first AP is $(N_1-N0)/2$, and a length is $N0+N_2-N_1+1$ bytes. In addition, because the offset is $(N_1-N0)/2$, in this case, if N0 is an odd number, $N_1$ is also an odd number. If N0 is an even number, $N_1$ is also an even number.

Embodiment 2

Figure 7:
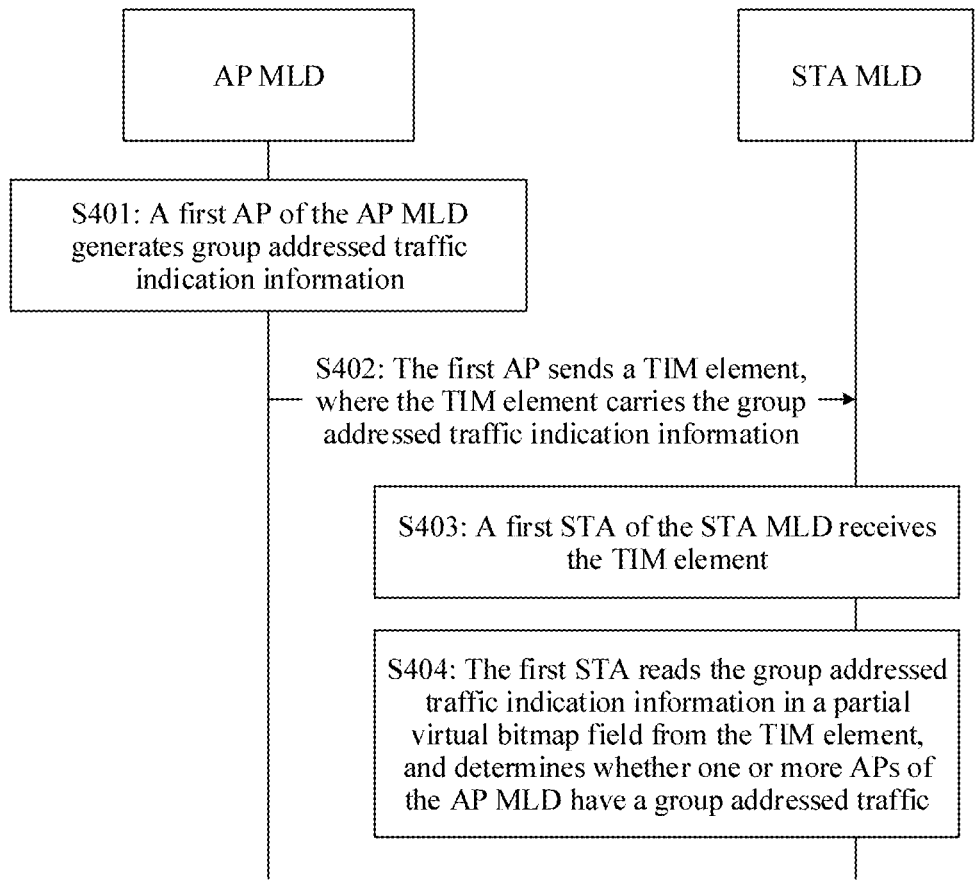
FIG. 7 is a schematic flowchart of a multi-link group addressed traffic transmission method 400 according to an embodiment of this application.

FIG. 7 is a schematic flowchart of a multi-link group addressed traffic transmission method 400. In the multi-link group addressed traffic transmission method 400, the group addressed traffic indication information is a part of bits in a partial virtual bitmap field in a traffic indication map TIM element. That is, the group addressed traffic indication information is a part of bits in the partial virtual bitmap field shown in FIG. 2. As shown in FIG. 7, the multi-link group addressed traffic transmission method 400 includes but is not limited to the following steps.

S401: A first AP of an AP MLD generates the group addressed traffic indication information.

S402: The first AP sends the TIM element.

The TIM element may be carried in a beacon frame, or may be carried in another management frame, for example, a TIM frame. The partial virtual bitmap field in the TIM element includes the group addressed traffic indication information. To be specific, the group addressed traffic indication information is the part of bits in the partial virtual bitmap field in the traffic indication map TIM element.

In addition, as described in the embodiment 1, optionally, for the beacon frame, the group addressed traffic indication information may be carried only in a DTIM beacon frame. Optionally, the group addressed traffic indication information may be carried in another frame such as a management frame, a data frame, or a control frame.

Figure 8:
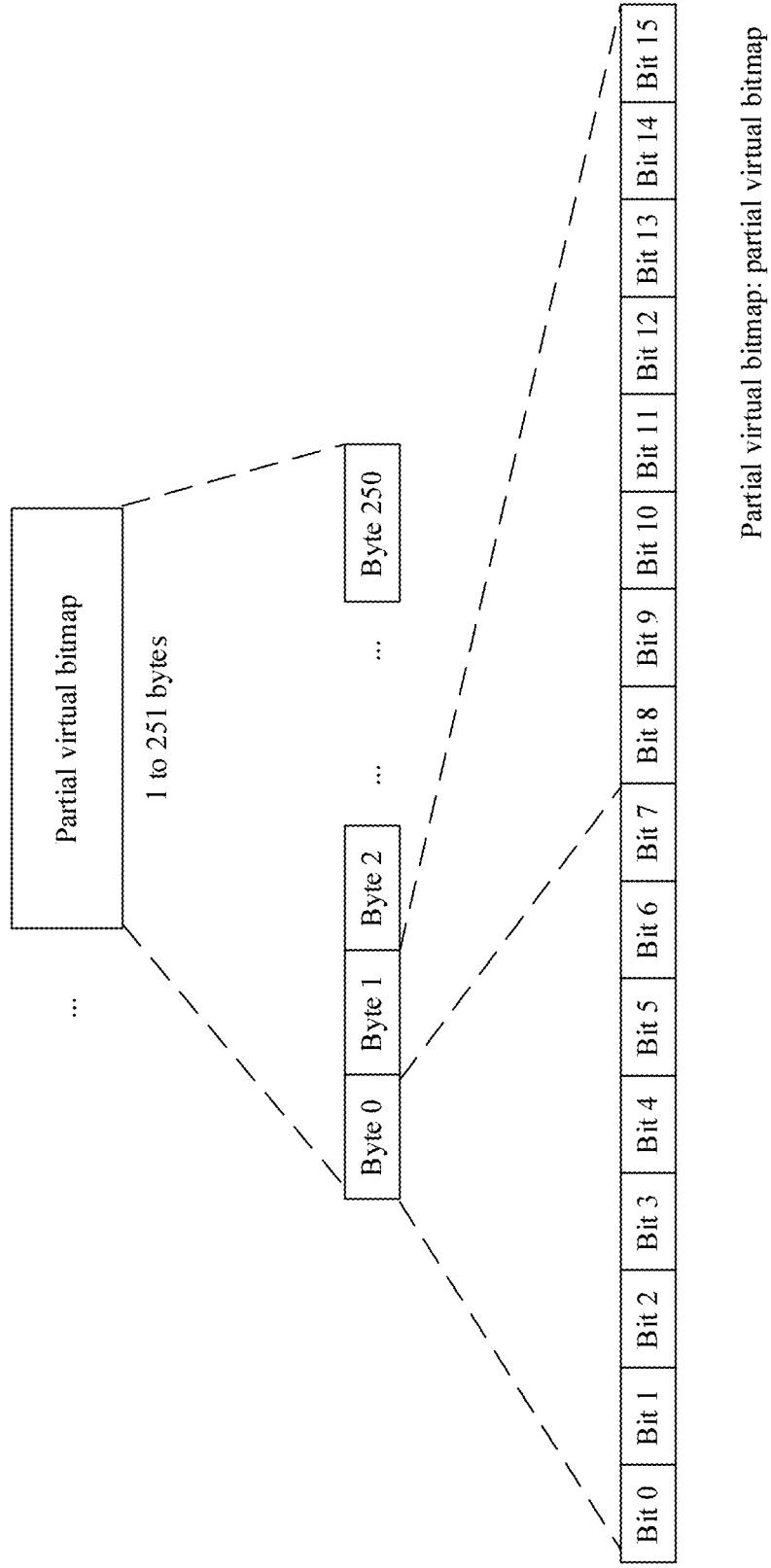
FIG. 8 is a schematic diagram of a partial virtual bitmap field according to an embodiment of this application.

For example, FIG. 8 shows bits of the partial virtual bitmap field in FIG. 2. For example, the partial virtual bitmap field has 251 bytes, and each byte includes 8 bits. As shown in FIG. 8, byte 0 includes bit 0 to bit 7, byte 1 includes bit 8 to bit 15, . . . , and the rest can be deduced by analogy. Byte 250 includes bit 2000 to bit 2007.

In an implementation, the group addressed traffic indication information is a part of consecutive bits in the partial virtual bitmap field. For example, if the group addressed traffic indication information is bit 1 to bit 7 in the partial virtual bitmap field in FIG. 8, bit 1 to bit 7 in the partial virtual bitmap field may indicate whether each AP of the AP MLD has a group addressed traffic.

In another implementation, the group addressed traffic indication information is a part of inconsecutive bits in the partial virtual bitmap field in FIG. 8. For example, if the group addressed traffic indication information is bit 1, bit 2, and bit 4 in the partial virtual bitmap field, bit 1, bit 2, and bit 4 in the partial virtual bitmap field may indicate whether each AP of the AP MLD has a group addressed traffic.

S403: A first STA of a STA MLD receives the TIM element.

S404: The first STA reads the group addressed traffic indication information in the partial virtual bitmap field from the TIM element, and determines whether one or more APs of the AP MLD have a group addressed traffic.

For related description of step S401, refer to the description of step S201 in the group addressed traffic transmission method 200 shown in FIG. 5. Details are not described herein again.

Optionally, the multi-link group addressed traffic transmission method 400 further includes: For an AP that is determined to have a group addressed traffic, the STA working on the link of the AP in the STA MLD receives a group addressed traffic after a DTIM beacon frame.

For example, the group addressed traffic indication information may be carried in any beacon frame, including a TIM beacon frame and a DTIM beacon frame. In this case, the DTIM beacon frame is a DTIM beacon frame after the TIM beacon frame, or is a DTIM beacon frame that carries the group addressed traffic indication information.

In another example, the group addressed traffic indication information is carried only in a DTIM beacon frame in a beacon frame. In this case, the DTIM beacon frame is a DTIM beacon frame that carries the group addressed traffic indication information.

Optionally, the group addressed traffic indication information may alternatively be carried in another frame such as a management frame, a data frame, or a control frame.

Specifically, for how to operate another AP of the AP MLD and another STA of the STA MLD, refer to description in a part of embodiments. Details are not described herein again.

As described in FIG. 2, the partial virtual bitmap is a part of bits of a traffic indication virtual bitmap field, and each bit corresponds to one AID. Therefore, in this embodiment of this application, the AP MLD allocates AIDs to APs included in the AP MLD, and further uses bits corresponding to the AIDs in the partial virtual bitmap field, to separately indicate whether APs of the AIDs have a group addressed traffic. That is, the group addressed traffic indication information is the bits corresponding to the AIDs. An AID allocated to an AP cannot be used by any AP of the AP MLD to allocate to a station associated with the AP. It may be further understood that an AID explicitly or implicitly allocated to the AP cannot be used for the STA MLD that establishes a multi-link association with the AP MLD in which the AP is located. AIDs allocated to all stations of the STA MLD are the same. "Explicitly" means that a management frame sent by the AP carries an association identifier of each AP or an association identifier of each AP other than the first AP of the AP MLD in which the AP is located, as mentioned in the following method 1. "Implicitly" refers to AIDs corresponding to bits occupied by the AP in the partial virtual bitmap field in the TIM element, as mentioned in the following method 2.

It can be learned that, in the multi-link group addressed traffic transmission method 400, the group addressed traffic indication information is carried in the partial virtual bitmap field in the beacon frame, so that flexibility of a group addressed traffic notification can be improved. In addition, when the group addressed traffic indication information indicates whether multiple APs have a group addressed traffic, power consumption of the STA MLD can also be reduced.

Figure 9:
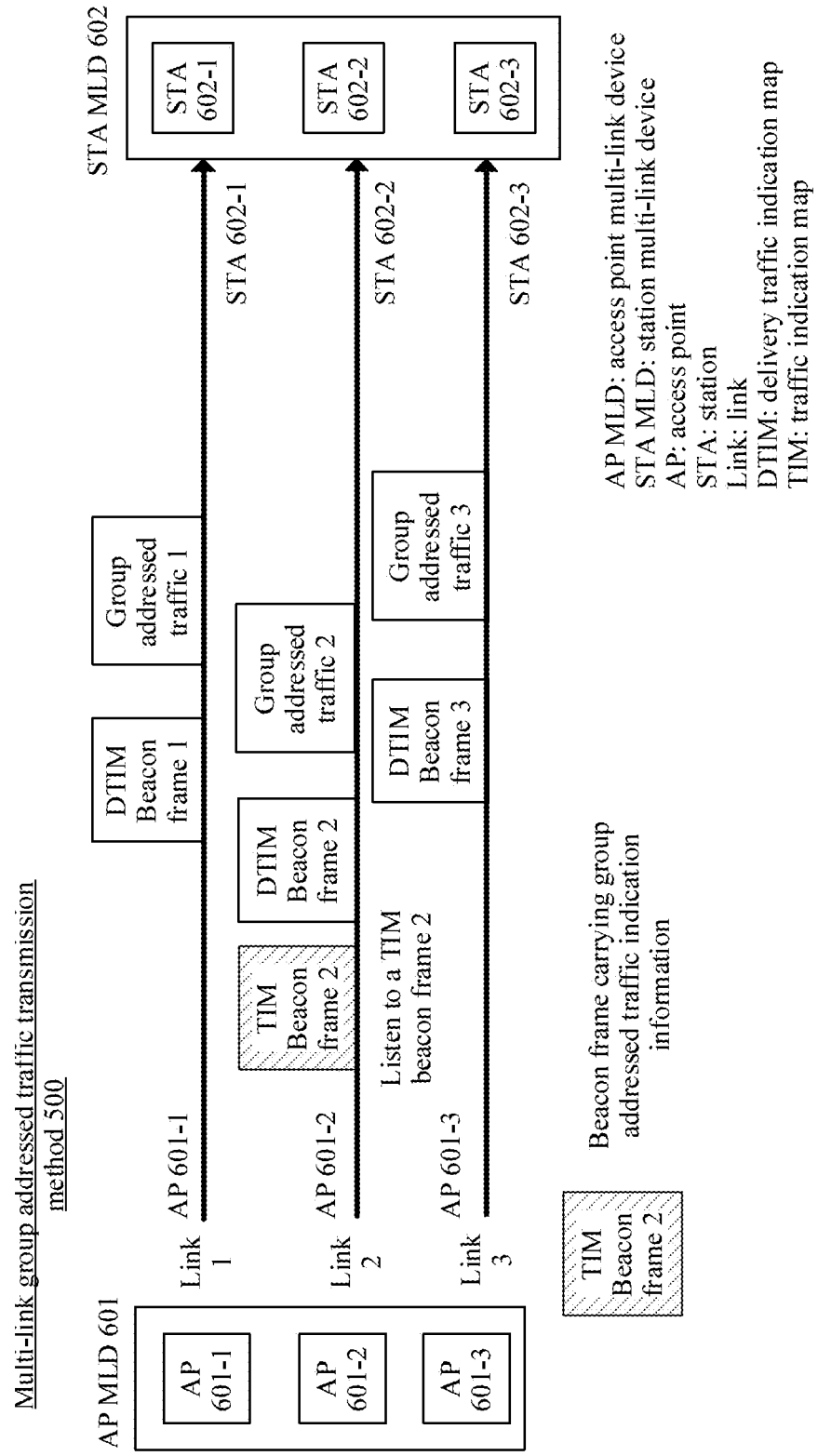
FIG. 9 is a schematic diagram of a multi-link group addressed traffic transmission method 500 according to an embodiment of this application.

It is assumed that in the communication system 300 shown in FIG. 3(c), AIDs of the AP 601-1 to the AP 601-3 in the AP MLD 601 are AID 1, AID 2, and AID 3. In this case, AID 1, AID 2, and AID 3 each correspond to each of 3 bits of the partial virtual bitmap field in the TIM beacon frame. In a multi-link group addressed traffic transmission method 500 shown in FIG. 9, an AP 601-2 sends a beacon frame 2, where a partial virtual bitmap field in the beacon frame 2 carries group addressed traffic indication information. A STA 602-1 listens to the beacon frame 2 on a link 2, and reads, from the partial virtual bitmap field in the beacon frame 2, 3 bits corresponding to AID 1, AID 2, and AID 3 as 111. In this case, the STA 602-1 may learn that an AP 601-1 to an AP 601-3 each have a group addressed traffic after a corresponding DTIM beacon frame. Further, the STA 602-1 to a STA 602-3 may separately listen to the subsequent group addressed traffic on a link on which the STA 602-1 to the STA 602-3 each work. It can be learned that in this implementation, the STA 602-1 and the STA 602-3 in a STA MLD 602 does not periodically listen to beacon frames to learn whether a corresponding AP has a group addressed traffic. This reduces power consumption of the STA MLD 602.

Optionally, for the beacon frame, if the group addressed traffic indication information is only carried in a DTIM beacon frame, the STA 602-1 that receives the DTIM beacon frame may receive a group addressed traffic after the DTIM beacon frame. Another STA of the STA MLD 602 further needs to receive a DTIM beacon frame and a subsequent group addressed traffic on its respective link.

The following discusses two AID configuration methods. To be specific, in a method 1, an AP MLD explicitly allocates an AID to each AP included in the AP MLD, and the AP MLD allocates the AID to each AP by using association identifier configuration information. In a method 2, an AP MLD implicitly allocates an AID to each AP included in the AP MLD. To be specific, an AID corresponding to a first bit of a part of consecutive bits that are in a partial virtual bitmap field and that correspond to group addressed traffic indication information is predefined. The method may further include two cases. A case 3.1 describes how to predefine an AID corresponding to an AP when the AP of the AP MLD does not work in a multi-BSSID (basic service set identifier) mode. A case 3.2 describes how to allocate the AID to each AP of the AP MLD when one or more APs of the AP MLD work in a multi-BSSID mode. In this case, in a partial virtual bitmap field of a TIM element, AIDs further need to be allocated to multiple APs in a multiple basic service set identifier set. Therefore, the AID allocated to each AP of the AP MLD cannot be the same as AIDs allocated to the multiple APs in the multiple basic service set identifier set. In other words, bits corresponding to each AP of the AP MLD in the partial virtual bitmap field are not repeated with bits corresponding to multiple non-transmitted APs in the multiple basic service set identifier set in the partial virtual bitmap field.

Method 1: The AP MLD explicitly allocates the AID to each AP included in the AP MLD.

Optionally, the AID configuration method includes but is not limited to the following steps: A first AP of the AP MLD generates association identifier configuration information, where the association identifier configuration information indicates an association identifier corresponding to each AP of the AP MLD. Specifically, the association identifier configuration information includes one or more pieces of association identifier subconfiguration information, each piece of association identifier subconfiguration information corresponds to one AP, and the association identifier subconfiguration information includes an AID of the AP. Optionally, the association subconfiguration information may be carried in a subelement or field that stores information about a single AP and that is in an MLD element used for information about one or more APs of the MLD. The first AP sends the association identifier configuration information. Each bit of group addressed traffic indication information indicates whether an AP with an AID corresponding to the bit has a group addressed traffic. The AID of each AP corresponds to each bit of the group addressed traffic indication information.

The first AP that generates and sends the association identifier configuration information and the first AP that generates and sends the group addressed traffic indication information in step S201 may be a same AP of the AP MLD, or may be different APs of the AP MLD.

In an implementation, if the AP MLD is not associated with the STA MLD, the association identifier configuration information may be carried in an association response frame sent by the STA MLD. In another implementation, if the AP MLD is associated with the STA MLD, the association identifier configuration information may be carried in a management frame sent by the STA MLD.

In this implementation, because the AP MLD allocates the AID to each AP of the AP MLD, the group addressed traffic indication information may be a part of bits in a partial virtual bitmap, and the part of bits may be consecutive or inconsecutive.

In addition, because AIDs corresponding to some bits in the partial virtual bitmap field are allocated to a station, and these bits separately indicate whether a corresponding station has a unicast traffic. Therefore, in this implementation, an association identifier allocated to each AP of the AP MLD is different from an association identifier allocated to a station associated with each AP. In other words, the association identifier allocated to each AP of the AP MLD cannot be allocated by the AP to a station managed by the AP. However, AIDs allocated by different APs to stations managed by the APs are relatively independent. In other words, the AIDs allocated by different APs to the stations managed by the APs can be the same. For example, it is assumed that in the communication system 300 shown in FIG. 3(*c*), AIDs allocated to the AP 601-1 to the AP 601-3 of the AP MLD 601 are AID 1, AID 2, and AID 3. In this case, AID 1, AID 2, and AID 3 cannot be allocated to stations associated with the AP 601-1 to the AP 601-3, for example, a STA of the STA MLD 602, a STA of the STA MLD 603, and the STA 604. However, the AID allocated by the AP 601-1 to the STA 602-1 of the STA MLD 602 may be the same as the AID allocated by the AP 601-2 to the STA 602-2 of the STA MLD 602. Even if the AID of the STA 602-1 is the same as the AID of the STA 602-2, the STA 602-1 and the STA 602-2 work on different links, namely, the link 1 and the link 2. Therefore, the STA 602-1 and the STA 602-2 with the same AID are not confused. It may be further understood that an AID explicitly or implicitly allocated to the AP of the AP MLD cannot be used for the STA MLD that establishes a multi-link association with the AP MLD in which the AP is located. AIDs allocated to all stations of the STA MLD are the same. "Implicitly" refers to AIDs corresponding to bits occupied by the AP in the partial virtual bitmap field in the TIM element, as mentioned in the following method 2.

Optionally, because each STA of the STA MLD is in a different basic service set BSS, the AP MLD may allocate an AID to each STA MLD. In other words, STAs in the STA MLD share one AID, and no confusion occurs. Alternatively, the AP MLD may allocate an AID to each STA of the STA MLD. In other words, each STA of the STA MLD has its own AID.

It can be learned that, in this implementation, the AID is allocated to each AP of the AP MLD, and the partial virtual bitmap field in the TIM element is used for notifying the STA MLD whether each AP of the AP MLD has a group addressed traffic. Compared with the manner of notifying, by using bit 0 in the bitmap control field in the TIM beacon frame on each link, the AP on each link of whether there is a group addressed traffic in the group addressed traffic processing method 100, in this implementation, flexibility of a group addressed traffic notification can be improved. In addition, when the group addressed traffic indication information indicates whether multiple APs have a group addressed traffic, power consumption of the STA MLD can also be reduced.

For example, it is assumed that in the communication system 300 shown in FIG. 3(*c*), AIDs allocated to the AP 601-1 to the AP 601-3 of the AP MLD601 are AID 1, AID 2, and AID 3. In this case, AID 1, AID 2, and AID 3 each correspond to each of 3 bits of the partial virtual bitmap field in the TIM element.

Optionally, multiple AIDs allocated to multiple APs of the AP MLD are consecutive.

Optionally, the partial virtual bitmap field may not carry group addressed traffic indication information of an AP (referred to as a reporting AP) that sends the partial virtual bitmap field, but carry group addressed traffic indication information of another AP of the MLD in which the reporting AP is located. The group addressed traffic indication information of the reporting AP is still indicated by bit 0 in a bitmap control field.

There are two implementations of not carrying herein. One is that the partial virtual bitmap field carries a bit corresponding to the reporting AP, but the bit is reserved and meaningless. The other is that the partial virtual bitmap field does not carry a bit corresponding to the reporting AP. This is applicable to another embodiment of the present disclosure, and details are not described again.

Method 2: The AP MLD implicitly allocates the AID to each AP included in the AP MLD.

When the AP MLD implicitly allocates the AID to each AP included in the AP MLD, it needs to be considered whether there is an AP of the AP MLD working in a multiple basic service set identifier mode, and whether the AP working in the multiple basic service set identifier mode is a transmitted AP. Therefore, the method 2 is discussed in two cases. To be specific, the case 3.1 discusses how to allocate the AID to each AP included in the AP MLD when no AP of the AP MLD works in the multiple basic service set identifier mode, and the case 3.2 discusses that the one or more APs of the AP MLD work in the multiple basic service set identifier mode and at least one AP is a transmitted AP in the multiple basic service set identifier set.

For ease of understanding, a related concept of a multiple basic service set identifier (Basic Service Set identifier, BSSID) is first described.

In an implementation, the multiple basic service set identifier set (Multiple BSSID set, which may be referred to as a multiple BSSID set) may be understood as a set of some cooperative APs. All cooperative APs use a same operating class, channel number, and antenna interface. In the multiple BSSID set, there is only one transmitted (Transmitted) BSSID AP, and other APs are nontransmitted (Nontransmitted) BSSID APs. Information about the multiple BSSID set (namely, a multiple BSSID element) is carried in a beacon frame, a probe response frame, or a neighbor report sent by the transmitted BSSID AP. Information about a BSSID of the nontransmitted BSSID AP is derived by a station based on the beacon frame, the probe response frame, the multiple BSSID element in the neighbor report, or the like. The BSSID of the nontransmitted BSSID AP is calculated by using a BSSID of the transmitted BSSID AP and a BSSID index field in a multiple BSSID-index element in a nontransmitted BSSID profile of the transmitted BSSID AP. For a specific method, refer to the Draft 802.11REVmd_D 3.0 protocol.

In another implementation, it may be understood that the multiple BSSID set includes multiple APs. Each AP manages one BSS, and different APs may have different SSIDs and permission, for example, a security mechanism or a transmission occasion.

In the multiple BSSID set, only an AP whose BSSID is a transmitted BSSID can send a beacon (beacon) frame and a probe response (Probe Response) frame. Therefore, if a probe request (Probe Request) frame sent by a STA is sent to an AP whose BSSID is a nontransmitted BSSID in the multiple BSSID set, the AP whose BSSID is the transmitted BSSID in the multiple BSSID set needs to help respond to the probe request frame, to send a probe response frame.

A BSSID of one AP in the multiple APs in the multiple BSSID set is configured as the transmitted (Transmitted) BSSID, and a transmitted BSSID AP may be referred to as a transmitted (transmitted) AP. A BSSID of another AP is configured as nontransmitted (Nontransmitted) BSSID, and a nontransmitted BSSID AP may be referred to as a nontransmitted (Nontransmitted) AP.

A frame format of the multiple BSSID element is shown in FIG. 10. The multiple BSSID element includes an element ID field, a length field, a maximum BSSID indicator field, and an optional subelement field. The maximum BSSID indicator field indicates a maximum quantity n of BSSIDs included in the multiple BSSID set, and the optional subelement field includes information about a BSSID of the nontransmitted BSSID AP.

A maximum quantity of APs allowed in the multiple BSSID set is $2^{(N_n)}$, where $N_n$ is a value indicated by a MaxBSSID indicator field in the multiple BSSID element in FIG. 7. Therefore, bit 1 to bit $2^{(N_n)}-1$ of a traffic indication virtual bitmap field may be allocated to nontransmitted BSSID APs in the multiple BSSID set respectively, to indicate whether the nontransmitted BSSID APs whose NonTxBSS IDs (identifiers) are 1 to 2n−1 have a group addressed traffic. A value of the NonTxBSS ID is equal to a value of the BSSID index field in the multiple BSSID-index element in the nontransmitted BSSID profile in the multiple BSSID element. The nontransmitted BSSID profile is in the optional subelement field.

Case 3.1: No AP of the AP MLD works in the multiple basic service set identifier mode.

In an implementation, each bit of the group addressed traffic indication information described in S201 corresponds to each AP of the AP MLD. Therefore, a start bit location of the group addressed traffic indication information in the partial virtual bitmap field in the TIM element may be determined in a predefined manner.

That is, AIDs of APs of the AP MLD are consecutively allocated starting from AID x, for example, the AIDs are consecutively allocated in descending order or ascending order of sizes of identifiers of links on which the APs work. AID x is predefined. Alternatively, a first bit or a start bit of the group addressed traffic indication information in the partial virtual bitmap field in the TIM element is predefined.

In this implementation, a part of bits that are in the partial virtual bitmap field in the TIM element and that correspond to the group addressed traffic indication information are consecutive. In other words, the group addressed traffic indication information corresponds to the part of consecutive bits in the partial virtual bitmap field in the TIM element.

For example, the AP MLD implicitly allocates AIDs to multiple APs of the AP MLD, that is, allocates a segment of default consecutive AIDs to all the APs of the AP MLD. For example, AIDs to all the APs of the AP MLD are consecutively allocated starting from AID 1 by default. It is assumed that the AP MLD has three APs: an AP 1, an AP 2, and an AP 3. In this case, AID 1, AID 2, and AID 3 are allocated to the AP 1, the AP 2, and the AP 3 respectively by default.

The AIDs are allocated by default in a sequence of identifiers of links on which the APs work. If link identifiers of the AP 1, the AP 2, and the AP 3 are respectively a link identifier 3, a link identifier 2, and a link identifier 1, AID 3, AID 2, and AID 1 are allocated to the AP 1, the AP 2, and the AP 3 respectively by default.

It can be learned that in this implementation, an AID corresponding to each AP does not need to be notified, by using the association response frame, the management frame, or the like described in the foregoing implementation, to a station managed by the AP, but is known by the station by default. This helps reduce signaling overheads.

In addition, because the nontransmitted AP in the multiple BSSID set cannot send the beacon frame, this implementation is also applicable to a scenario in which one or more APs of the AP MLD work in the multi-BSSID mode, but the one or more APs are nontransmitted APs. In other words, no AP of the MLD is a transmitted AP in the multiple BSSID set.

Optionally, the partial virtual bitmap field may not carry group addressed traffic indication information of an AP (referred to as a reporting AP) that sends the partial virtual bitmap field, but carry group addressed traffic indication information of another AP of the MLD in which the reporting AP is located. The group addressed traffic indication information of the reporting AP is still indicated by bit 0 in a bitmap control field. In this case, bits corresponding to the group addressed traffic indication information in the partial virtual bitmap field are still consecutive, and only the group addressed traffic indication information of the reporting AP is skipped. For example, AID 1, AID 2, and AID 3 are implicitly allocated to the AP 1, the AP 2, and the AP 3 of the AP MLD respectively, or the AP 1, the AP 2, and the AP 3 correspond to bit 1 to bit 3 in the traffic indication virtual bitmap field. If the AP 1 sends the group addressed traffic indication information, the group addressed traffic indication information includes only group addressed traffic indications of the AP 2 and the AP 3, and bit 1 and bit 2 in the partial virtual bitmap field are used. If the AP 2 sends the group addressed traffic indication information, the group addressed traffic indication information includes only group addressed traffic indications of the AP 1 and the AP 3, and bit 1 and bit 2 in the partial virtual bitmap field are used.

Case 3.2: One or more APs of the AP MLD work in the multi-BSSID mode, and at least one AP is a transmitted AP in the multiple BSSID set.

It is assumed that there are a total of n transmitted BSSID APs in the AP MLD, and a value indicated by a MaxBSSID indicator field of the multiple BSSID set in which a $y^{th}$ transmitted BSSID AP is located is $N_y$, configuration or predefinition of bits corresponding to APs of the AP MLD starts from bit x of the traffic indication virtual bitmap field. Alternatively, it is assumed that there are n APs in the AP MLD in total or n APs belong to the multiple BSSID set. $N_y$ of an AP that does not work in the multi-BSSID mode is equal to 0, $N_y$ of an AP that works in the multi-BSSID mode and that is a nontransmitted BSSID AP is equal to 0, and $N_y$ of an AP that works in the multi-BSSID mode and that is a transmitted BSSID AP is equal to a value indicated by a MaxBSSID indicator field of the multiple BSSID set in which the AP is located.

In an implementation, the group addressed traffic indication information starts with bit x of the traffic indication virtual bitmap field, and x is equal to $\max\{2^{\wedge}(N_1), 2^{\wedge}(N_2), \ldots, 2^{\wedge}(N_y), \ldots, 2^{\wedge}(N_n)\}$.

In other words, an AID corresponding to a first bit of a part of consecutive bits that are in the partial virtual bitmap field and that correspond to the group addressed traffic indication information is AID x. Alternatively, AIDs of APs of the AP MLD are consecutively allocated starting from AID x. x is equal to $\max\{2^{\wedge}(N_1), 2^{\wedge}(N_2), \ldots, 2^{\wedge}(N_y), \ldots, 2^{\wedge}(N_n)\}$. Alternatively, configuration or predefinition of bits that are in the traffic indication virtual bitmap and that correspond to APs of the AP MLD starts from bit x. x is equal to $\max\{2^{\wedge}(N_1), 2^{\wedge}(N_2), \ldots, 2^{\wedge}(N_y), \ldots, 2^{\wedge}(N_n)\}$.

For example, AP MLD has two APs: an AP 1 and an AP 2. Both the AP 1 and the AP 2 are APs that work in the multiple BSSID mode and transmitted BSSID APs. A maximum BSSID indicator field in a multiple BSSID element sent by the AP 1 is 3, and a maximum BSSID indicator field in a multiple BSSID element sent by the AP 2 is 2. In this case, a maximum quantity of nontransmitted BSSID APs in a multiple BSSID set supported by the AP 1 is 7, and a maximum quantity of nontransmitted BSSID APs in a multiple BSSID set supported by the AP 2 is 3. Therefore, a start AID in AIDs allocated by the AP MLD to the AP 1 and the AP 2 is AID 8, or a start bit of the AP 1 and the AP 2 in the traffic indication virtual bitmap field is bit 8.

In addition, this implementation is also applicable to a scenario in which one or more APs of the AP MLD work in the multi-BSSID mode. Optionally, the partial virtual bitmap field may not carry group addressed traffic indication information of an AP (referred to as a reporting AP) that sends the partial virtual bitmap field, but carry group addressed traffic indication information of another AP of the MLD in which the reporting AP is located. The group addressed traffic indication information of the reporting AP is still indicated by bit 0 in a bitmap control field. In this case, bits corresponding to the group addressed traffic indication information in the partial virtual bitmap field are still consecutive, and only the group addressed traffic indication information of the reporting AP is skipped. In the foregoing example, a start bit of the AP 1 and the AP 2 in the traffic indication virtual bitmap field is bit 8, and the AP 1 and the AP 2 in the AP MLD correspond to bit 8 and bit 9 in the traffic indication virtual bitmap field. If the AP 1 sends the group addressed traffic indication information, the group addressed traffic indication information includes only a group addressed traffic indication of the AP 2, and bit 8 in the partial virtual bitmap field is used. If the AP 2 sends the group addressed traffic indication information, the group addressed traffic indication information includes only a group addressed traffic indication of the AP 1, and bit 8 in the partial virtual bitmap field is used.

Similarly, the multi-link group addressed traffic transmission method 400 and the multi-link group addressed traffic transmission method 500 may alternatively be as described in the multi-link group addressed traffic transmission method 200, where one or more APs of the AP MLD send a beacon frame that carries the group addressed traffic indication information, and one or more STAs of the STA MLD listen to the beacon frame. A difference lies in that, in the multi-link group addressed traffic transmission method 400 and the multi-link group addressed traffic transmission method 500, the group addressed traffic indication information is carried in the partial virtual bitmap field in the TIM element. Correspondingly, the one or more APs in the AP MLD may send the beacon frame, and any multiple STAs of the STA MLD listen to the beacon frame. It can be learned that, in this implementation, flexibility of listening to group addressed traffic indication information by the STA MLD is greatly improved. In addition, one or a part of STAs in the STA MLD listen to the group addressed traffic indication information, so that power consumption of the STA MLD can also be reduced. Optionally, the group addressed traffic indication information may be carried only in a DTIM beacon frame.

In another implementation, the first STA in steps S203 and S204 may be a station working on a primary link in the STA MLD, and the first STA of the STA MLD listens to a beacon frame sent by an AP working on the primary link.

In still another implementation, the first STA in steps S203 and S204 is a station working on a primary link in the STA MLD. Optionally, the STA MLD may notify the AP MLD of a primary link on which the STA MLD works. For example, the station on the primary link in the STA MLD notifies, of a link identifier of the station, an AP corresponding to the STA in the AP MLD. In this way, the AP working on the primary link in the AP MLD sends the beacon frame, and another AP may not send the beacon frame. This helps reduce power consumption of the AP MLD or helps the AP MLD send the group addressed traffic indication information more effectively, for example, repeatedly send the group addressed traffic indication information on multiple links.

In addition, for an implementation of how the AP MLD learns the primary link on which the STA MLD works, refer to the foregoing description. Details are not described herein again.

Similarly, in the multi-link group addressed traffic transmission method 400 and the multi-link group addressed traffic transmission method 500, the group addressed traffic indication information sent by the first AP may include bits corresponding to AIDs of a part of APs, or include bits corresponding to AIDs of a part of stations, to reduce bit overheads required by the TIM element. It is assumed that the group addressed traffic indication information is the partial virtual bitmap field in the TIM element, and the partial virtual bitmap field is a part of bits of the traffic indication virtual bitmap field. The traffic indication virtual bitmap field of the AP is not sent or carried in the TIM element. The following discusses a length field, an offset, and the partial virtual bitmap field (namely, the group addressed traffic indication information) in the TIM element in two cases, namely, case 4.1 and case 4.2.

Case 4.1: This case is applicable to the case 3.1 in the method 1 and the method 2.

In other words, related content of the case 4.1 is applicable to a case in which each AP of the AP MLD does not work in the multi-BSSID mode, or a case in which each AP works in the multi-BSSID mode but is a nontransmitted AP. Optionally, this may also be applicable to another case.

The group addressed traffic indication information is all bits starting from byte $N_1$ of the traffic indication virtual bitmap field and ending at byte $N_2$, where $N_1$ is greater than or equal to 0, and $N_2$ is greater than or equal to $N_1$.

In this case, a compression manner in a protocol is used. When none of multiple APs with consecutive association identifiers has a group addressed traffic, the partial virtual bitmap field may not carry bits corresponding to these association identifiers. That is, a quantity of bits of the group addressed traffic indication information in partial virtual bitmap field is reduced by using an offset in the TIM element.

It is assumed that stations of AIDs corresponding to a bit prior to a largest even byte $N_1$ and all bits following a smallest byte $N_2$ in the traffic indication virtual bitmap field have no received downlink traffic, or APs of the corresponding AIDs have no sent group addressed traffic. In this case, the group addressed traffic indication information is all bits starting from byte $N_1$ of the traffic indication virtual bitmap field and ending at byte $N_2$.

To reduce signaling overheads required for sending the offset, in other words, reduce a quantity of bits required for indicating the offset, the offset of second group addressed traffic indication information may be set to $N_1/2$. That is, $N_1$ is an even byte number.

In this case, the length field of the TIM element sent by the first AP is $N_2-N_1+1+3$, and an offset of the TIM element is $(½)N_1$. Further, a station managed by the first AP in the STA MLD receives the length and the offset, and determines that the group addressed traffic indication information indicates that stations of AIDs corresponding to bits $N_1*8$ to $((N_2+1)*8-1))$ have no received downlink traffic or APs of the corresponding AIDs have no sent group addressed traffic, determines that APs of AIDs corresponding to all bits of bit 0 to bit $N_1*8-1$ have no group addressed traffics, and determines that APs of AIDs corresponding to bits $(N_2+1)*8$ and all subsequent bits have no group addressed traffic.

For example, if the offset in the TIM element sent by the first AP is 0 and the length field is 4 bytes (that is, the partial virtual bitmap is 1 byte), the group addressed traffic indication information sent by the first AP is bit 0 to bit 7 in the partial virtual bitmap field. In this way, if an AID of an AP is in a range of AIDs corresponding to bit 0 to bit 7, the first STA may learn, based on values of bit 0 to bit 7, whether APs of AIDs corresponding to bit 0 to bit 7 have a group addressed traffic. If an AID of an AP is not in a range of AIDs corresponding to bit 0 to bit 7, the AP does not send a group addressed traffic to a station associated with the AP or a surrounding station.

For another example, if the offset sent by the first AP is 1 and the length is 4 bytes (that is, the partial virtual bitmap is 1 byte), the group addressed traffic indication information sent by the first AP is byte 2 in the partial virtual bitmap field, namely, bit 16 to bit 23. In this way, if an AID of an AP is in a range of AIDs corresponding to bit 16 to bit 23, the first STA may learn, based on values of bit 16 to bit 23, whether APs of AIDs corresponding to bit 16 to bit 23 have a group addressed traffic. If an AID of an AP is not in a range of AIDs corresponding to bit 16 to bit 23, the AP does not send a group addressed traffic to a station associated with the AP or a surrounding station.

For another example, it is assumed that the offset sent by the first AP is 0, a length is 4 bytes, the partial virtual bitmap field is 01100110, and bits 0 to 7 respectively correspond to an AP 1 to an AP 8 of the AP MLD. In this case, the first STA may learn that the AP 1, the AP 4, the AP 5, and the AP 8 have no group addressed traffic, and the AP 2, the AP 3, the AP 6, and the AP 7 have group addressed traffics. Optionally, if bit 0 is predefined to be meaningless, that is, bit 0 does not correspond to any AP, bit 1 to bit 7 respectively correspond to the AP 1 to the AP 7 of the AP MLD, and the first STA may learn that the AP 1, the AP 2, the AP 5, and the AP 6 have group addressed traffics, and the AP 3, the AP 4, and the AP 7 have no group addressed traffic.

Case 4.2: This case is applicable to the case 3.2 in the method 2.

That is, related content of the case 4.2 is applicable to a case in which one or more APs of the AP MLD work in the multi-BSSID mode and one AP is a transmitted AP. Optionally, this may also be applicable to another case.

Method A: The group addressed traffic indication information is located in the partial virtual bitmap field, where the partial virtual bitmap field is bits starting from byte 0 of the traffic indication virtual bitmap field and ending at byte $N_2$. $N_2$ is a minimum byte quantity number, so that values of bit $(N_2+1)*8$ to bit 2007 in the traffic indication virtual bitmap field are all 0, a maximum byte quantity number of the traffic indication virtual bitmap field is 251, and a corresponding maximum AID is $2^251-1=2007$. In this case, the offset is 0, and the length field is $N_2+1+3$.

Method B: The group addressed traffic indication information is located in the partial virtual bitmap field, where the partial virtual bitmap field is bits starting from byte 0 of the traffic indication virtual bitmap field and ending at byte N0-1, and bits starting from byte $N_1$ of the traffic indication virtual bitmap field and ending at byte $N_2$.

A maximum quantity of bytes of the traffic indication virtual bitmap field is 251 bytes, and a corresponding maximum AID is AID 2007. In this case, stations of AIDs corresponding to bit N0*8-1 to bit $N_1*8-1$ of the traffic indication virtual bitmap field have no received downlink traffic or APs of the corresponding AIDs have no sent group addressed traffic, and stations of AIDs corresponding to bit $N_2*8$ to bit 2007 have no received downlink traffic or APs of the corresponding AIDs have no sent group addressed traffic. In this case, the group addressed traffic indication information sent by the first AP may include bits starting from byte 0 of the traffic indication virtual bitmap field and ending at byte N0-1, and include bits starting from byte $N_1$ of the traffic indication virtual bitmap field and ending at byte $N_2$. In addition, it is required that if N0 is an odd number, $N_1$ is also an odd number; if N0 is an even number, $N_1$ is also an even number.

In this case, the offset of the TIM element is $(N_1-N0)/2$, and the length field is $N0+N_2-N_1+4$ bytes. In addition, the offset is $(N_1-N0)/2$.

In addition, it is assumed that the AP MLD has an AP that works in the multi-BSSID mode and that is a transmitted BSSID AP, and a largest value indicated by a MaxBSSID indicator field of each AP that works in the multi-BSSID mode and that is a transmitted BSSID AP is n. In this case, a minimum byte quantity number of N0 needs to satisfy N0*8-2n-N_AP<8, where N_AP is a quantity of APs included in the AP MLD or the quantity of APs minus 1. In this case, the offset is $(N_1-N0)/2$ bytes, and the length is $N0+N_2-N_1+4$ bytes.

In the foregoing embodiments provided in this application, the methods provided in embodiments of this application are separately described from perspectives of the AP MLD and the STA MLD. To implement functions in the methods provided in the foregoing embodiments of this application, the AP MLD and the STA MLD each may include a hardware structure and a software module, to implement the foregoing functions in a form of the hardware structure, the software module, or a combination of the hardware structure and the software module. A function in the foregoing functions may be performed in a form of the hardware structure, the software module, or a combination of the hardware structure and the software module. The following describes in detail communication apparatuses in embodiments of this application with reference to FIG. 11 to FIG. 14. The communication apparatus is an access point in an access point multi-link device or a station in a station multi-link device. Further, the communication apparatus may be an apparatus in an AP MLD, or an apparatus in a STA MLD.

FIG. 11 is a schematic block diagram of a communication apparatus 100. The communication apparatus 100 corresponds to the AP MLD, or any AP of the AP MLD described in any one of the foregoing multi-link group addressed traffic transmission method 200 to the multi-link group addressed traffic transmission method 500. Optionally, the communication apparatus 100 is an AP or an apparatus of the AP MLD in FIG. 3(*a*) to FIG. 3(*c*).

The communication apparatus 100 includes:

a processing unit 101, configured to generate group addressed traffic indication information, where the group addressed traffic indication information indicates whether one or more APs of the AP MLD have a group addressed traffic; and a communication unit 102, configured to send the group addressed traffic indication information.

It can be learned that, in the communication apparatus 100, the group addressed traffic indication information generated by the processing unit 101 can indicate whether the access point or another AP has a group addressed traffic, and then the communication unit 102 sends the group addressed traffic indication information to a station multi-link device. In this way, any station of the station multi-link device can listen to the group addressed traffic indication information. This improves flexibility of a group addressed traffic notification. In addition, if the group addressed traffic indication information indicates whether each AP or multiple APs of the AP MLD have a group addressed traffic, any station of the station multi-link device can learn whether the multiple APs have a group addressed traffic. Therefore, not all stations of the station multi-link device need to listen to whether there is a group addressed traffic on a respective link. This reduces power consumption of the station multi-link device.

In an implementation, each bit of the group addressed traffic indication information corresponds to each AP of the AP MLD. A value of the bit indicates whether the AP corresponding to the bit has a group addressed traffic. For details, refer to related content in the embodiments shown in FIG. 5 and FIG. 6 in the foregoing method embodiments.

In addition, the group addressed traffic indication information sent by a transceiver may be a part of bits of the group addressed traffic indication information generated by a processor, for example, related content described in the case 2.1 to the case 2.2. Details are not described herein again.

In another implementation, the group addressed traffic indication information is a part of bits in a partial virtual bitmap field in a traffic indication map TIM element. Alternatively, the group addressed traffic indication information is a part of consecutive bits in the partial virtual bitmap field in the traffic indication map TIM element.

It can be learned that, in this implementation, the AP MLD allocates AIDs to APs included in the AP MLD, and further uses bits corresponding to the AIDs in the partial virtual bitmap field, to separately indicate whether APs of the AIDs have a group addressed traffic. That is, the group addressed traffic indication information is the bits corresponding to the AIDs. For details, refer to related content shown in FIG. 7 to FIG. 9 in the foregoing method embodiments.

In addition, for whether the AID corresponding to each AP of the AP MLD is explicitly allocated or implicitly predefined, or for how to determine the AID corresponding to each AP of the AP MLD when the AP MLD has an AP that works in a multi-BSSID mode and that is a transmitted BSSID AP, refer to the method 1 and the method 2 in the foregoing method embodiments. Details are not described herein again.

For example, if the AID corresponding to each AP of the AP MLD is explicitly allocated, in the communication apparatus, the processing unit 101 is further configured to generate association identifier configuration information, where the association identifier configuration information indicates the association identifier AID corresponding to each AP of the AP MLD. The AID of the AP corresponds to each bit of the group addressed traffic indication information. The communication unit 102 is further configured to send the association identifier configuration information.

In addition, in this implementation, because AIDs corresponding to some bits in the partial virtual bitmap field are AIDs of stations, an association identifier AID corresponding to each bit of the group addressed traffic indication information is different from an AID of a station managed by each AP of the AP MLD.

For another example, an AID corresponding to a first bit of the part of consecutive bits that are in the partial virtual bitmap field and that correspond to the group addressed traffic indication information is predefined.

For another example, an AID corresponding to a first bit of the part of consecutive bits that are in the partial virtual bitmap field in the traffic indication map TIM element and that correspond to the group addressed traffic indication information is AID x.

x is equal to max{$2^{(N_1)}, 2^{(N_2)}, \ldots, 2^{(N_y)}, \ldots, 2^{(N_n)}$}. n is a quantity of transmitted basic service set identifier BSSID APs in the AP MLD, $N_y$ is a value of a maximum basic service set identifier BSSID indication field in a multiple basic service set identifier (Multiple BSSID) element broadcast by a transmitted BSSID $AP_y$. The transmitted BSSID $AP_y$ is a $y^{th}$ transmitted BSSID AP of the AP MLD.

In the communication apparatus 100, the communication unit 102 is further configured to send a delivery traffic indication map DTIM beacon frame and a group addressed traffic after the DTIM beacon frame. When an AP in which the communication apparatus 100 is located has a group addressed traffic, the communication unit 102 may perform this operation.

It should be understood that the communication apparatus 100 in this embodiment of this application may correspondingly perform the multi-link group addressed traffic transmission method 200 to the multi-link group addressed traffic transmission method 500 in embodiments of this application. In addition, the foregoing operations or functions of the units in the communication apparatus 100 are separately used for implementing corresponding procedures of the methods in FIG. 5 and FIG. 7. For brevity, details are not described herein again.

FIG. 12 is a schematic block diagram of a communication apparatus 200. The communication apparatus 200 corresponds to the STA MLD or any STA of the STA MLD, or a STA working on a primary link of the STA MLD described in any one of the foregoing multi-link group addressed traffic transmission method 200 to the multi-link group addressed traffic transmission method 500. Optionally, the communication apparatus 200 is the STA or an apparatus of the STA MLD in FIG. 1. Alternatively, the communication apparatus 200 is the STA or an apparatus of the STA MLD in FIG. 3(*a*) to FIG. 3(*c*).

The communication apparatus 200 includes:

a communication unit 201, configured to receive group addressed traffic indication information from an AP MLD, where the group addressed traffic indication information indicates whether one or more APs of the AP MLD have a group addressed traffic; and a processing unit 202, configured to determine, based on the group addressed traffic indication information, whether the one or more APs have a group addressed traffic.

It can be learned that, in the communication apparatus 200, the processing unit 202 may learn, based on the group addressed traffic indication information, whether the one or more APs have a group addressed traffic. To be specific, the communication apparatus 200 can not only learn whether an AP associated with the station has a group addressed traffic, but also learn whether another AP of the AP MLD has a group addressed traffic. This improves flexibility of a group addressed traffic notification. In addition, the group addressed traffic indication information indicates whether multiple APs or each AP of the AP MLD have or has a group addressed traffic. That is, any STA of the STA MLD in which the communication apparatus 200 is located can learn whether the multiple APs or each AP of the AP MLD have or has a group addressed traffic. Therefore, not all STAs of the STA MLD in which the communication apparatus 200 is located need to listen to whether a corresponding AP has a group addressed traffic. This reduces power consumption of the STA MLD in which the communication apparatus 200 is located.

In an implementation, a STA corresponding to the communication apparatus 200 is a station of the STA MLD working on the primary link. In this way, that the communication unit 201 receives group addressed traffic indication information from the AP MLD is specifically as follows: The communication unit 201 listens to the group addressed traffic indication information from one AP of the AP MLD on the primary link. In this implementation, another STA of the STA MLD does not periodically listen to the group addressed traffic indication information, so that power consumption of the STA MLD is reduced.

For how the communication apparatus 200 determines the primary link, refer to the description in the foregoing method embodiments. Details are not described herein again.

In an implementation, the communication unit 201 is further configured to receive a delivery traffic indication map DTIM beacon frame and a group addressed traffic after the DTIM beacon frame. In this implementation, when the processing unit 202 determines that an AP corresponding to the processing unit 202 has a group addressed traffic, the communication unit 201 may perform this operation.

In an implementation, each bit of the group addressed traffic indication information corresponds to each AP of the AP MLD. A value of the bit indicates whether the AP corresponding to the bit has a group addressed traffic. For details, refer to related content in the embodiments shown in FIG. 5 and FIG. 6 in the foregoing method embodiments.

In addition, the group addressed traffic indication information sent by a transceiver may be a part of bits of the group addressed traffic indication information generated by a processor, for example, related content described in the case 2.1 to the case 2.2. Details are not described herein again.

In another implementation, the group addressed traffic indication information is a part of bits in a partial virtual bitmap field in a traffic indication map TIM element. Alternatively, the group addressed traffic indication information is a part of consecutive bits in the partial virtual bitmap field in the traffic indication map TIM element.

It can be learned that, in this implementation, the AP MLD allocates AIDs to APs included in the AP MLD, and further uses bits corresponding to the AIDs in the partial virtual bitmap field, to separately indicate whether APs of the AIDs have a group addressed traffic. That is, the group addressed traffic indication information is the bits corresponding to the AIDs. For details, refer to related content shown in FIG. 7 to FIG. 9 in the foregoing method embodiments.

In addition, for whether the AID corresponding to each AP of the AP MLD is explicitly allocated or implicitly predefined, or for how to determine the AID corresponding to each AP of the AP MLD when the AP MLD has an AP that works in a multi-BSSID mode and that is a transmitted BSSID AP, refer to the method 1 and the method 2 in the foregoing method embodiments. Details are not described herein again.

For example, if the AID corresponding to each AP of the AP MLD is explicitly allocated, in the communication apparatus 200, the communication unit 201 is further configured to receive association identifier configuration information, where the association identifier configuration information indicates the association identifier AID corresponding to each AP of the AP MLD. The AID of the AP corresponds to each bit of the group addressed traffic indication information. The processing unit 202 is further configured to determine, based on the association identifier configuration information, the AID corresponding to the AP of the AP MLD.

In addition, in this implementation, because AIDs corresponding to some bits in the partial virtual bitmap field are AIDs of stations, an association identifier AID corresponding to each bit of the group addressed traffic indication information is different from an AID of a station managed by each AP of the AP MLD.

For another example, an AID corresponding to a first bit of the part of consecutive bits that are in the partial virtual bitmap field and that correspond to the group addressed traffic indication information is predefined.

For another example, an AID corresponding to a first bit of the part of consecutive bits that are in the partial virtual bitmap field in the traffic indication map TIM element and that correspond to the group addressed traffic indication information is AID x.

x is equal to $\max\{2^{\wedge}(N_1), 2^{\wedge}(N_2), \ldots, 2^{\wedge}(N_y), \ldots, 2^{\wedge}(N_n)\}$. n is a quantity of APs that transmits a BSSID in the AP MLD, $N_y$ is a value of a maximum basic service set identifier BSSID indication field in a multiple basic service set identifier multiple BSSID element broadcast by a transmitted BSSID $AP_y$. The transmitted BSSID $AP_y$ is a $y^{th}$ transmitted BSSID AP of the AP MLD.

It should be understood that the communication apparatus 200 in this embodiment of this application may correspondingly perform the multi-link group addressed traffic transmission method 200 to the multi-link group addressed traffic transmission method 500 in embodiments of this application. In addition, the foregoing operations or functions of the units in the communication apparatus 200 are separately used for implementing corresponding procedures of one STA or the first STA of the STA MLD in the methods in FIG. 5 and FIG. 7. For brevity, details are not described herein again.

Figure 13:
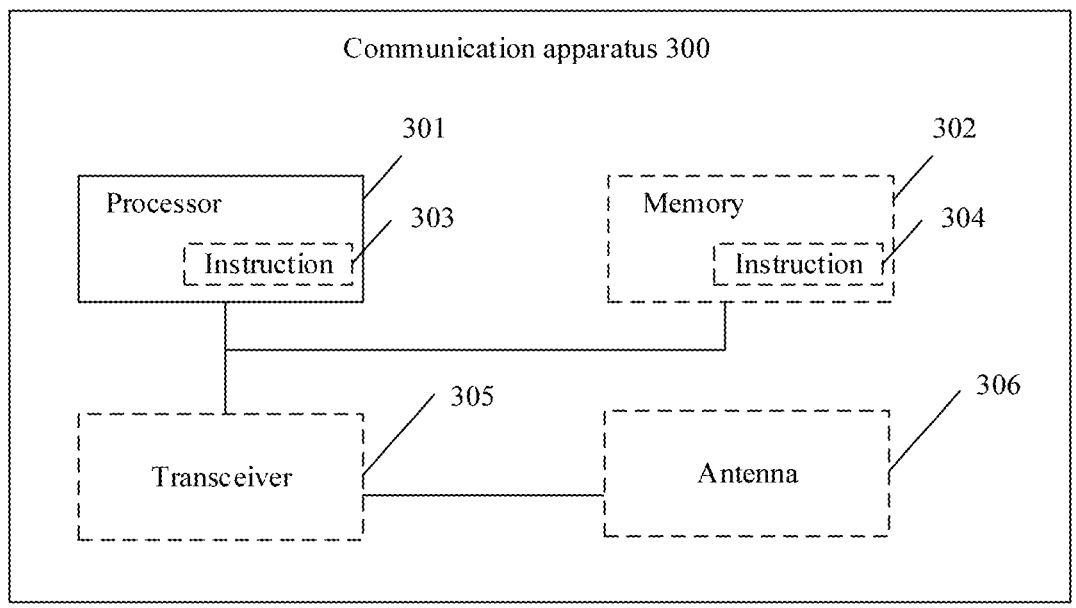
FIG. 13 is a schematic diagram of a structure of a communication apparatus 300 according to an embodiment of this application.

FIG. 13 is a schematic block diagram of a communication apparatus 300. In an implementation, the communication apparatus 300 corresponds to the AP MLD, or any AP of the AP MLD described in any one of the foregoing multi-link group addressed traffic transmission method 200 to the multi-link group addressed traffic transmission method 500. Optionally, the communication apparatus 300 may be an AP or an apparatus of the AP MLD in FIG. 1. Alternatively, the communication apparatus 300 is the AP or an apparatus of the AP MLD in FIG. 3(*a*) to FIG. 3(*c*). Optionally, the communication apparatus 300 is a chip, a chip system, a processor, or the like that implements the foregoing method embodiments. The communication apparatus 300 may be configured to implement the methods described in the foregoing method embodiments. For details, refer to the description in the foregoing method embodiments.

In another implementation, the communication apparatus 300 corresponds to the STA MLD or any STA of the STA MLD, or a STA working on a primary link of the STA MLD described in any one of the foregoing multi-link group addressed traffic transmission method 200 to the multi-link group addressed traffic transmission method 500. Optionally, the communication apparatus 300 is the STA or an apparatus of the STA MLD in FIG. 1. Alternatively, the communication apparatus 300 is the STA or an apparatus of the STA MLD in FIG. 3(*a*) to FIG. 3(*c*). Optionally, the communication apparatus 300 is a chip, a chip system, a processor, or the like that implements the foregoing method embodiments. The communication apparatus 300 may be configured to implement the methods described in the foregoing method embodiments. For details, refer to the description in the foregoing method embodiments.

The communication apparatus 300 may include one or more processors 301. The processor 301 may be a general-purpose processor, a dedicated processor, or the like. For example, the processor 301 may be a baseband processor or a central processing unit. The baseband processor may be configured to process a communication protocol and communication data, and the central processing unit may be configured to control a communication apparatus (for example, a base station, a baseband chip, a terminal, a terminal chip, a DU, or a CU) to execute a computer program, to process data of the computer program.

The communication apparatus 300 may further include a transceiver 305. The transceiver 305 may be referred to as a transceiver unit, a transceiver machine, a transceiver circuit, or the like, and is configured to implement a transceiver function. The transceiver 305 may include a receiver and a transmitter. The receiver may be referred to as a receiver circuit, or the like, and is configured to implement a receiving function. The transmitter may be referred to as a transmitter circuit, or the like, and is configured to implement a sending function. Optionally, the communication apparatus 300 may further include an antenna 306.

Optionally, the communication apparatus 300 may include one or more memories 302, and the memory 302 may store instructions 304. The instructions 304 may be a computer program. The computer program may be run on the communication apparatus 300, to enable the communication apparatus 300 to perform the methods described in the foregoing method embodiments. Optionally, the memory 302 may further store data. The communication apparatus 300 and the memory 302 may be separately disposed, or may be integrated.

The communication apparatus 300 is configured to implement a function of an AP of the AP MLD in the multi-link group addressed traffic transmission method 200 to the multi-link group addressed traffic transmission method 500 in the foregoing method embodiments.

The processor 301 may be configured to perform step S201 in FIG. 5, step S401 in FIG. 7, and optional implementations of an AID corresponding to an AP in method 1 and method 2, for example, generating an association identifier configuration information about a multi-link group addressed traffic transmission method.

The transceiver 305 is configured to perform step S202 in FIG. 5, step S402 in FIG. 7, and optional implementations of an AID corresponding to an AP in method 1 and method 2, for example, sending the association identifier configuration information.

The communication apparatus 300 is configured to implement a function of a STA of the STA MLD in the multi-link group addressed traffic transmission method 200 to the multi-link group addressed traffic transmission method 500 in the foregoing method embodiments.

The transceiver 305 is configured to perform step S203 in FIG. 5, step S403 in FIG. 7, and optional implementations of an AID corresponding to an AP in method 1 and method 2, for example, receiving the association identifier configuration information.

The processor 301 may be configured to perform step S204 in FIG. 5 and step S404 in FIG. 7, and optional implementations of determining the AID of the AP in the foregoing method 1 and method 2, for example, determining the association identifier of each AP of the AP MLD based on the association identifier configuration information.

In an implementation, the processor 301 may include a transceiver configured to implement a receiving function and a sending function. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In an implementation, the processor 301 may store instructions 303. The instructions may be a computer program. The computer program 303 is run on the processor 301, to enable the communication apparatus 300 to perform the methods described in the foregoing method embodiments. The computer program 303 may be fixed in the processor 301, and in this case, the processor 301 may be implemented by hardware.

In an implementation, the communication apparatus 300 may include a circuit, and the circuit may implement a sending, receiving, or communication function in the foregoing method embodiments. The processor and the transceiver described in this application may be implemented in an integrated circuit (integrated circuit, IC), an analog IC, a radio frequency integrated circuit RFIC, a mixed-signal IC, an application-specific integrated circuit (application-specific integrated circuit, ASIC), or a printed circuit board (printed circuit board, PCB), an electronic device, and the like. The processor and the transceiver may be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type channel metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

The communication apparatus described in the foregoing embodiment may be an AP MLD or an AP of the AP MLD. However, a scope of the communication apparatus described in this application is not limited thereto, and a structure of the communication apparatus may not be limited by FIG. 13. The communication apparatus may be an independent device or may be a part of a large device. For example, the communication apparatus may be:

(1) an independent integrated circuit IC, a chip, or a chip system or subsystem;

(2) a set including one or more ICs, where optionally, the IC set may further include a storage component configured to store data and a computer program;

(3) an ASIC, for example, a modem (Modem);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) another device or the like.

Figure 14:
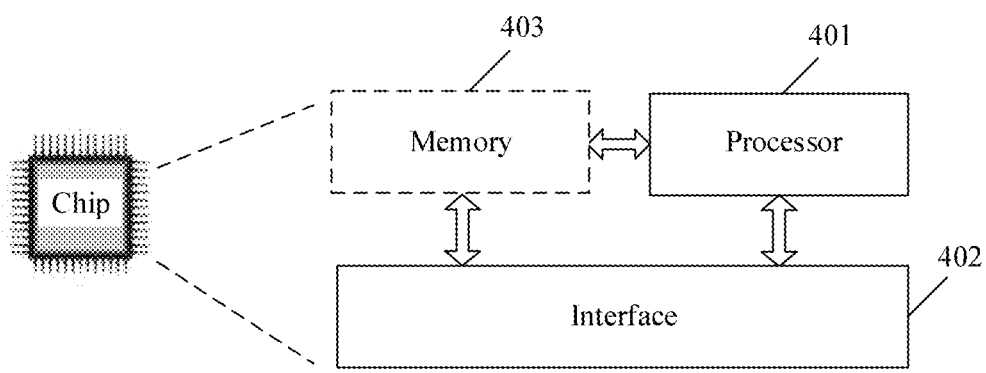
FIG. 14 is a schematic diagram of a structure of a chip according to an embodiment of this application.

For a case in which the communication apparatus may be a chip or a chip system, refer to a schematic diagram of a structure of a chip shown in FIG. 14. The chip shown in FIG. 14 includes a processor 401 and an interface 402. There may be one or more processors 401, and there may be multiple interfaces 402.

The chip is configured to implement a function of an AP of the AP MLD in the multi-link group addressed traffic transmission method 200 to the multi-link group addressed traffic transmission method 500 in the foregoing method embodiments.

In an implementation, the processor 401 is configured to generate group addressed traffic indication information, where the group addressed traffic indication information indicates whether one or more APs of an AP MLD have a group addressed traffic.

The interface 402 is configured to send the group addressed traffic indication information.

It can be learned that, in the chip, the group addressed traffic indication information generated by the processor can indicate whether the access point or another AP has a group addressed traffic, and then the transceiver sends the group addressed traffic indication information to a station multi-link device. In this way, any station of the station multi-link device can listen to the group addressed traffic indication information. This improves flexibility of a group addressed traffic notification. In addition, if the group addressed traffic indication information indicates whether each AP or multiple APs of the AP MLD have a group addressed traffic, any station of the station multi-link device can learn whether the multiple APs have a group addressed traffic. Therefore, not all stations of the station multi-link device need to listen to whether there is a group addressed traffic on a respective link. This reduces power consumption of the station multi-link device.

Optionally, the chip may further perform a function of an AP of the AP MLD in the multi-link group addressed traffic transmission method 200 to the multi-link group addressed traffic transmission method 500. Details are not described herein again.

The chip is configured to implement a function of a STA of the STA MLD in the multi-link group addressed traffic transmission method 200 to the multi-link group addressed traffic transmission method 500 in the foregoing method embodiments.

In an implementation, the interface 402 is configured to receive group addressed traffic indication information from the AP MLD, where the group addressed traffic indication information indicates whether one or more APs of the AP MLD have a group addressed traffic.

Optionally, the processor 401 is configured to determine, based on the group addressed traffic indication information, whether the one or more APs have a group addressed traffic.

It can be learned that, in the chip, the processor may learn, based on the group addressed traffic indication information, whether the one or more APs have a group addressed traffic. To be specific, the chip can not only learn whether an AP associated with the station has a group addressed traffic, but also learn whether another AP of the AP MLD has a group addressed traffic. This improves flexibility of a group addressed traffic notification. In addition, the group addressed traffic indication information indicates whether multiple APs or each AP of the AP MLD have or has a group addressed traffic. That is, any STA of the STA MLD in which the chip is located can learn whether the multiple APs or each AP of the AP MLD have or has a group addressed traffic. Therefore, not all STAs of the STA MLD in which the chip is located need to listen to whether a corresponding AP has a group addressed traffic. This reduces power consumption of the STA MLD in which the chip is located.

Optionally, the chip may further perform a function of a STA of the STA MLD in the multi-link group addressed traffic transmission method 200 to the multi-link group addressed traffic transmission method 500. Details are not described herein again.

A person skilled in the art may further understand that various illustrative logical blocks (illustrative logic block) and steps (step) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

This application further provides a computer-readable storage medium. The computer-readable storage medium stores a computer program, and when the computer-readable storage medium is executed by a computer, a function of any one of the foregoing method embodiments is implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs. When the computer program is loaded and executed on a computer, the procedures or functions according to embodiments of this application are all or partially generated. The computer may be a general-purpose computer, a dedicated computer, a computer network, or other programmable apparatuses. The computer program may be stored in a computer-readable storage medium or may be transmitted from a computer-readable storage medium to another computer-readable storage medium. For example, the computer program may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

A person of ordinary skill in the art may understand that first, second, and various reference numerals in this application are merely distinguished for convenient description, and are not used to limit a scope of embodiments of this application, and also indicate a sequence.

"The at least one" in this application may alternatively be described as one or more, and "the multiple" means two, three, four, or more. This is not limited in this application. In embodiments of this application, "first", "second", "third", "A", "B", "C", "D", and the like are used for distinguishing between technical features described by them. There is no chronological order or no size order between the technical features described by "first", "second", "third", "A", "B", "C", and "D".

The correspondences shown in the tables in this application may be configured, or may be predefined. Values of the information in the tables are only examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-link group addressed traffic transmission method, comprising:
    generating, by a first access point (AP) of an access point multi-link device (AP MLD), group addressed traffic indication information comprising a set of bits in a partial virtual bitmap field in a traffic indication map (TIM) element, wherein the set of bits in the partial virtual bitmap field in the TIM element indicates whether each AP of one or more second APs has a group addressed traffic, the one or more second APs being one or more other APs of the AP MLD except the first AP; and
    sending, by the first AP, the group addressed traffic indication information.

2. The method according to claim 1, wherein
    an association identifier (AID) corresponding to each bit of the group addressed traffic indication information is different from an AID of a station managed by each AP of the AP MLD; or
    an AID corresponding to each bit of the group addressed traffic indication information is different from an AID of a station multilink device (STA MLD) associated with the AP MLD, and multiple stations (STAs) of the STA MLD share one AID.

3. The method according to claim 1, wherein the set of bits in the partial virtual bitmap field comprises a fixed quantity of consecutive bits for the one or more second APs of the AP MLD.

4. The method according to claim 1, wherein in the set of bits in the partial virtual bitmap field, one or more first bits correspond to the one or more second APs of the AP MLD, and one or more second bits for the AP MLD are set to zero.

5. The method according to claim 1, wherein the set of bits in the partial virtual bitmap field comprises a plurality of consecutive bits correspond to the one or more second APs, in ascending order according to link identifiers of the one or more second APs.

6. A first access point (AP) of an access point multi-link device (AP MLD), comprising:
    a processor configured to generate group addressed traffic indication information comprising a set of bits in a partial virtual bitmap field in a traffic indication map (TIM) element, wherein the set of bits in the partial virtual bitmap field in the TIM element indicates whether each AP of one or more second APs has a group addressed traffic, the one or more second APs being one or more other APs of the AP MLD except the first AP; and
    a transceiver coupled to the processor and configured to send the group addressed traffic indication information.

7. The first AP according to claim 6, wherein an association identifier (AID) corresponding to each bit of the group addressed traffic indication information is different from an AID of a station managed by each AP of the AP MLD; or an AID corresponding to each bit of the group addressed traffic indication information is different from an AID of a station multilink device (STA MLD) associated with the AP MLD, and multiple stations (STAs) of the STA MLD share one AID.

8. The first AP according to claim 6, wherein the set of bits in the partial virtual bitmap field comprises a fixed quantity of consecutive bits for the one or more second APs of the AP MLD.

9. The first AP according to claim 6, wherein in the set of bits in the partial virtual bitmap field, one or more first bits correspond to the one or more second APs of the AP MLD, and one or more second bits for the AP MLD are set to zero.

10. The first AP according to claim 6, wherein the set of bits in the partial virtual bitmap field comprises a plurality of consecutive bits correspond to the one or more second APs, in ascending order according to link identifiers of the one or more second APs.

11. The first AP according to claim 6, wherein the group addressed traffic indication information is carried in a delivery traffic indication map (DTIM) beacon frame.

12. A chip applied for a first access point (AP) of an access point multi-link device (AP MLD), comprising:

a processor configured to generate group addressed traffic indication information comprising a set of bits in a partial virtual bitmap field in a traffic indication map (TIM) element, wherein the set of bits in the partial virtual bitmap field in the TIM element indicates whether each access point (AP) of one or more second APs has a group addressed traffic, the one or more second APs being one or more other APs of the AP MLD except the first AP; and an interface coupled to the processor and configured to output the group addressed traffic indication information.

13. The chip according to claim 12, wherein an association identifier (AID) corresponding to each bit of the group addressed traffic indication information is different from an AID of a station managed by each AP of the AP MLD; or an AID corresponding to each bit of the group addressed traffic indication information is different from an AID of a station multilink device (STA MLD) associated with the AP MLD, and multiple stations (STAs) of the STA MLD share one AID.

14. The chip according to claim 12, wherein the set of bits in the partial virtual bitmap field comprises a fixed quantity of consecutive bits for the one or more second APs of the AP MLD.

15. The chip according to claim 12, wherein in the set of bits in the partial virtual bitmap field, one or more first bits correspond to the one or more second APs of the AP MLD, and one or more second bits for the AP MLD are set to zero.

16. The chip according to claim 12, wherein the set of bits in the partial virtual bitmap field comprises a plurality of consecutive bits correspond to the one or more second APs, in ascending order according to link identifiers of the one or more second APs.

17. An access point multilink device (AP MLD), comprising a first access point (AP) and one or more second APs, wherein the first AP is configured to:

generate group addressed traffic indication information comprising a set of bits in a partial virtual bitmap field in a traffic indication map (TIM) element, wherein the set of bits in the partial virtual bitmap field in the TIM element indicates whether each AP of the one or more second APs has a group addressed traffic, the one or more second APs being one or more other APs of the AP MLD except the first AP; and send the group addressed traffic indication information.

18. The AP MLD according to claim 17, wherein an association identifier (AID) corresponding to each bit of the group addressed traffic indication information is different from an AID of a station managed by each AP of the AP MLD; or an AID corresponding to each bit of the group addressed traffic indication information is different from an AID of a station multilink device (STA MLD) associated with the AP MLD, and multiple stations (STAs) of the STA MLD share one AID.

19. The AP MLD according to claim 17, wherein the set of bits in the partial virtual bitmap field comprises a fixed quantity of consecutive bits for the one or more second APs of the AP MLD.

20. The AP MLD according to claim 17, wherein in the set of bits in the partial virtual bitmap field, one or more first bits correspond to the one or more second APs of the AP MLD, and one or more second bits for the AP MLD are set to zero.

21. The AP MLD according to claim 17, wherein the set of bits in the partial virtual bitmap field comprises a plurality of consecutive bits correspond to the one or more second APs, in ascending order according to link identifiers of the one or more second APs.

22. The AP MLD according to claim 17, wherein the group addressed traffic indication information is carried in a delivery traffic indication map (DTIM) beacon frame.

* * * * *